(12) United States Patent
Nishino et al.

(10) Patent No.: US 8,434,324 B2
(45) Date of Patent: May 7, 2013

(54) EVAPORATOR UNIT

(75) Inventors: Tatsuhiko Nishino, Obu (JP); Tomohiko Nakamura, Obu (JP); Hiroshi Oshitani, Toyota (JP); Hirofumi Futamata, Okazaki (JP)

(73) Assignee: Denso Corporation, Kariya (JP)

( * ) Notice: Subject to any disclaimer, the term of this patent is extended or adjusted under 35 U.S.C. 154(b) by 280 days.

(21) Appl. No.: 13/065,548

(22) Filed: Mar. 24, 2011

(65) Prior Publication Data

US 2011/0259042 A1 Oct. 27, 2011

(30) Foreign Application Priority Data

Apr. 5, 2010 (JP) .................................. 2010-87116
Apr. 5, 2010 (JP) .................................. 2010-87117

(51) Int. Cl.
F25B 41/06 (2006.01)

(52) U.S. Cl.
USPC .......................................................... 62/527

(58) Field of Classification Search .............. 62/84, 470, 62/503, 512, 525, 527; 165/148, 152, 176
See application file for complete search history.

(56) References Cited

U.S. PATENT DOCUMENTS

| | | | | |
|---|---|---|---|---|
| 3,199,130 | A * | 8/1965 | Sprague, Jr. ..................... | 12/4.1 |
| 6,477,857 | B2 * | 11/2002 | Takeuchi et al. ................ | 62/500 |
| 6,782,713 | B2 * | 8/2004 | Takeuchi et al. ................ | 62/500 |
| 7,448,436 | B2 * | 11/2008 | Katoh et al. .................... | 165/61 |
| 7,654,108 | B2 * | 2/2010 | Ishizaka et al. ................ | 62/500 |
| 2007/0163294 | A1 | 7/2007 | Aung et al. | |
| 2008/0000263 | A1 * | 1/2008 | Oomura et al. ................ | 62/525 |
| 2008/0264097 | A1 | 10/2008 | Ishizaka et al. | |
| 2009/0007592 | A1 | 1/2009 | Higashiyama | |
| 2009/0229305 | A1 | 9/2009 | Yamada et al. | |
| 2010/0175422 | A1 | 7/2010 | Yamada et al. | |

FOREIGN PATENT DOCUMENTS

| | | |
|---|---|---|
| JP | 2006-226668 | 8/2006 |
| JP | 2007-57222 | 3/2007 |
| JP | 2007-192465 | 8/2007 |
| JP | 2009-58221 | 3/2009 |
| JP | 2009-222256 | 10/2009 |

* cited by examiner

Primary Examiner — Melvin Jones
(74) Attorney, Agent, or Firm — Harness, Dickey & Pierce, PLC

(57) ABSTRACT

An integrated unit is formed by integrally assembling an ejector, a first evaporator that evaporates refrigerant discharged from the ejector, a second evaporator that evaporates the refrigerant drawn into the ejector, a refrigerant dividing portion that adjusts a flow amount of refrigerant flowing in and divided to the nozzle portion and the second evaporator, and a joint in which a refrigerant inlet and a refrigerant outlet are formed. In the joint, there is formed a gas-liquid separation portion that causes refrigerant flowing therein to swirl to separate it into gas and liquid. The ejector, refrigerant dividing portion and joint are arranged in a longitudinal direction of the ejector.

20 Claims, 22 Drawing Sheets

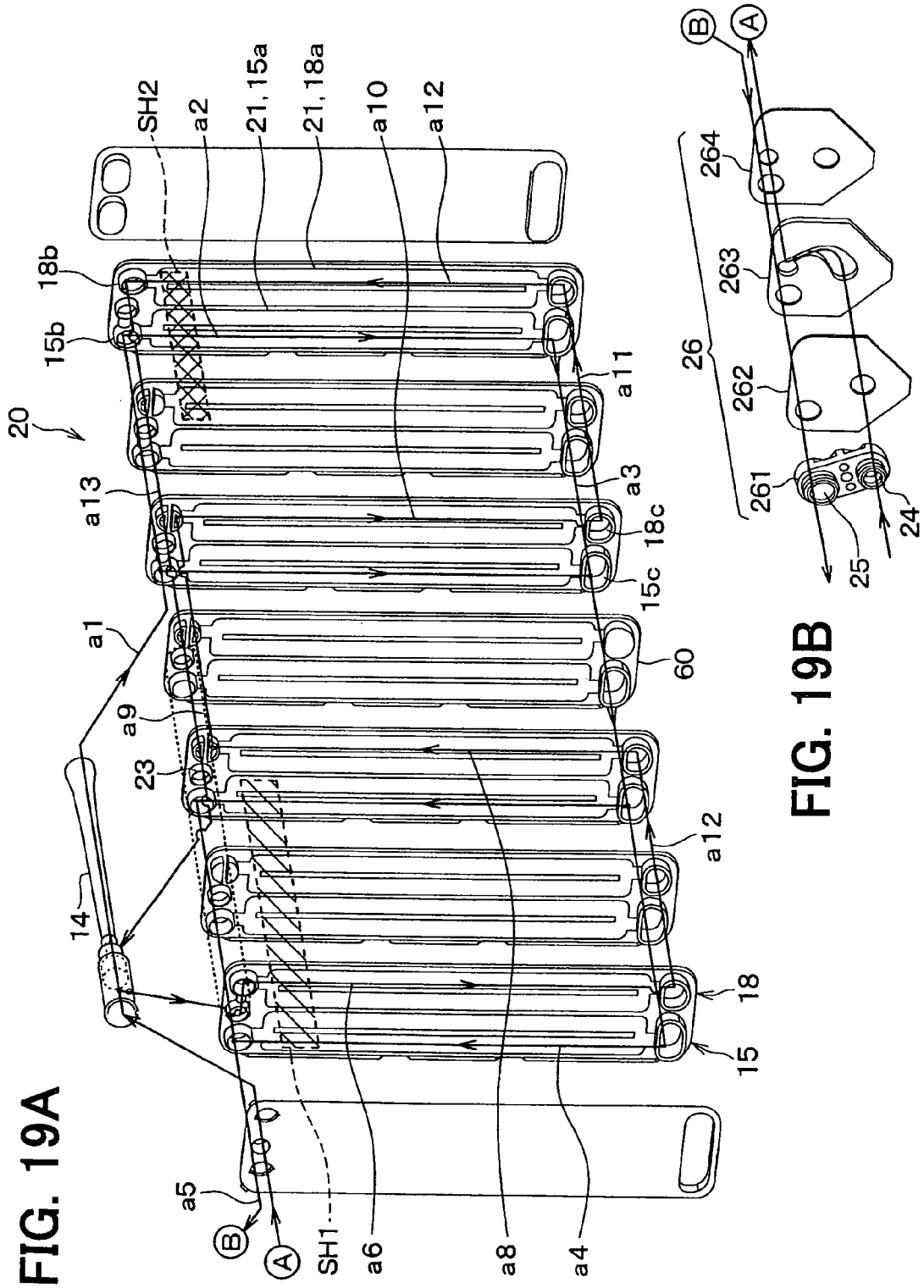

EVAPORATOR UNIT

CROSS REFERENCE TO RELATED APPLICATION

This application is based on Japanese Patent Applications No. 2010-087116 filed on Apr. 5, 2010, and No. 2010-087117 filed on Apr. 5, 2010, the contents of which are incorporated herein by reference in its entirety.

TECHNICAL FIELD

The present invention relates to an evaporator unit applied to a refrigeration cycle.

BACKGROUND

Patent Document 1 (JP 2009-222256A) discloses an ejector refrigeration cycle. In the refrigeration cycle, a branch portion for branching a flow of refrigerant flowing out of a radiator is provided upstream of an ejector that functions as a refrigerant depressurizing means and a refrigerant circulating means. One flow of refrigerant branched at the branch portion causes to flow into the nozzle portion of the ejector, and the other flow of refrigerant causes to flow toward the refrigerant suction port of the ejector.

In the conventional technology, a first evaporator is disposed downstream of the diffuser portion (pressurizing portion) of the ejector, and a throttling mechanism and a second evaporator are disposed between the branch portion and the refrigerant suction port of the ejector. Thus, the refrigeration capacity can be obtained in both the first and second evaporators.

In the conventional technology, a flow amount divider is arranged at the refrigerant branch portion. The flow amount divider carries out gas-liquid separation by the centrifugal force or gravity of refrigerant, so that the refrigerant is separated into gas and liquid and is divided to the nozzle portion side of the ejector and the side of the throttling mechanism and the second evaporator.

The dryness of refrigerant on the nozzle portion side of the ejector is thereby made lower than the dryness of refrigerant on the side of the throttling mechanism and the second evaporator. The efficiency (COP) of the refrigeration cycle is thereby enhanced.

In general, each ejector applied to ejector refrigeration cycles is formed in a substantially cylindrical shape. A refrigerant inflow port is provided at one end of the ejector in the longitudinal direction and a refrigerant outflow port is provided at the other end thereof in the longitudinal direction. In addition, a refrigerant suction port is provided in the cylinder wall surface between the refrigerant inflow port and the refrigerant outflow port.

In the ejector refrigeration cycle, therefore, it is necessary to connect other cycle component equipment to the refrigerant inflow port, the refrigerant outflow port, and the refrigerant suction port of the ejector. This complicates the connection with the other cycle component equipment as compared with ordinary refrigeration cycles (expansion valve cycles) not provided with an ejector.

In the ejector refrigeration cycle, for this reason, degradation in incorporability is incurred when it is incorporated in a product, such as an air conditioning system and a refrigeration unit, unlike ordinary refrigeration cycles. In consideration of the above, for example, Patent Documents 2 and 3 (JP 2007-57222A and JP 2007-192465A) propose that an ejector, first and second evaporators, and the like are integrated as an evaporator unit, so as to enhance the incorporability of the ejector refrigeration cycle in products.

The present inventors considered taking the following measure to enhance the incorporability of ejector refrigeration cycles: a gas-liquid separation portion and a refrigerant dividing portion equivalent to the flow amount divider in Patent Document 1 are integrated as an evaporator unit together with an ejector and first and second evaporators.

However, this involves a problem. To separate refrigerant into gas and liquid at the gas-liquid separation portion, a certain space is necessary. Therefore, when the gas-liquid separation portion and the refrigerant dividing portion are integrated as an evaporator unit together with the ejector and the first and second evaporators, the physical size of the evaporator unit is increased.

The gas-liquid separation portions used in refrigeration cycles are required that the gas-liquid separation of refrigerant should be stably carried out even when the refrigerant flow amount is varied by an air conditioning load.

In the evaporator units in Patent Documents 2 and 3, a first evaporator and a second evaporator are disposed in series with respect to the flow of air as the fluid to be cooled so that air sent to an identical space to be cooled can be cooled at both the evaporators.

However, in the evaporator unit disclosed in Patent Document 2, as viewed in the direction of air flow, the downstream area of the heat exchange core portion of the first evaporator in the refrigerant flow and the downstream area of the heat exchange core portion of the second evaporator in the refrigerant flow are overlapped with each other. As a result, a temperature distribution is produced in the air blown out of the evaporator unit.

The reason for this is as follows: in the downstream area of the heat exchange core portion of an evaporator in the refrigerant flow, the refrigerant is brought into gas phase and it has a degree of superheat. More specific description will be given. The air passing through the downstream areas (hereafter, referred to as superheat areas) of the heat exchange core portions of both the evaporators in the refrigerant flow only absorbs the sensible heat from the refrigerant. Therefore, the air is not sufficiently cooled, as compared with a case where the air absorbs evaporation latent heat. In the evaporator unit in Patent Document 2, as a result, a temperature distribution is produced in air blown out.

In the evaporator unit in Patent Document 3, in order to suppress the temperature distribution of air blown out of the evaporator unit, the evaporators are so arranged that the superheat area of the first evaporator and the superheat area of the second evaporator do not overlap with each other as viewed in the direction of air flow. As described above, the ejector is formed in a substantially cylindrical shape and the positions of the refrigerant inflow port, refrigerant outflow port and refrigerant suction port are approximately determined.

For this reason, in the evaporator unit of Patent Document 3, a part of the first evaporator and the second evaporator are arranged on the downstream side (leeward side) in the air flow, the remaining part of the first evaporator is arranged on the upstream side (windward side) of air flow, and a refrigerant pipe for forcibly guiding refrigerant flowing out of the ejector to the first evaporator placed on the windward side is added. Thus, the evaporators are so arranged that the superheat area of the first evaporator and the superheat area of the second evaporator do not overlap with each other as viewed in the direction of air flow.

However, the evaporation temperature of refrigerant in the first evaporator is higher than the evaporation temperature of refrigerant in the second evaporator.

Therefore, when a part of the first evaporator is arranged on the leeward side as in the evaporator unit in Patent Document 3, a temperature difference is produced between air blown out of this part of the first evaporator and air blown out of the second evaporator. As a result, the temperature distribution of air blown out of the evaporator unit cannot be sufficiently suppressed.

As described above, the refrigerant pipe for forcibly guiding refrigerant flowing out of the ejector to the first evaporator is placed on the windward side. This prevents reduction of the size of the evaporator unit. Further, the pressure of refrigerant increased at the diffuser portion of the ejector is lowered due to pressure loss that occurs while the refrigerant passes through the refrigerant pipe. As a result, the cycle efficient (COP) enhancement effect obtained by reducing the consumed power of a compressor cannot be sufficiently obtained.

SUMMARY

In view of the foregoing problems, it is an object of the invention to suppress increase in the physical size of an evaporator unit in which a gas-liquid separation portion and a refrigerant dividing portion are formed integrally with an ejector and first and second evaporators.

It is another object of the invention to make it possible to stably carry out gas-liquid separation of refrigerant in an evaporator unit including an evaporator and a gas-liquid separation portion for separating refrigerant flowing into the evaporator into gas and liquid, even when the refrigerant flow amount is varied.

It is further another object of the invention to provide an evaporator unit, which can sufficiently suppress a temperature distribution of air blown out and can sufficiently enhance cycle efficiency, when being applied to an ejector refrigeration cycle.

According to a first example of the present invention, an evaporator unit includes: an ejector configured to suck refrigerant through a refrigerant suction port by a high-speed refrigerant flow jetted from a nozzle portion, to mix the refrigerant jetted from the nozzle portion and the refrigerant sucked through the refrigerant suction port, and to discharge the refrigerant; a first evaporator connected to the outlet side of the ejector and evaporating the refrigerant discharged from the ejector; a second evaporator connected to the refrigerant suction port and evaporating the refrigerant to be drawn into the ejector; a refrigerant dividing portion connected to the inlet side of the nozzle portion and the inlet side of the second evaporator and adjusting the flow amount of refrigerant flowing in and divided to the nozzle portion and the second evaporator; and a joint in which a refrigerant inlet and a refrigerant outlet are formed and which causes the refrigerant flowing in through the refrigerant inlet to flow out to the refrigerant dividing portion and causes the refrigerant flowing out of the first evaporator to flow out to the refrigerant outlet. In the evaporator unit, the ejector, the first evaporator, the second evaporator, the refrigerant dividing portion and the joint are integrally assembled to configure an integrated unit. In addition, the joint is provided with a gas-liquid separation portion that causes the refrigerant flowing therein to swirl and to separate the refrigerant into gas and liquid, and the ejector, the refrigerant dividing portion and the joint are arranged in a longitudinal direction of the ejector.

According to the foregoing, the gas-liquid separation portion is formed in a joint and the ejector, the refrigerant dividing portion, and the joint are arranged in line in the longitudinal direction of the ejector. For this reason, increase in the physical size of the unit can be suppressed even though the following measure is taken to enhance the incorporability of an ejector refrigeration cycle: the gas-liquid separation portion and the refrigerant dividing portion are integrated as an evaporator unit together with the ejector and the first and second evaporators.

For example, the gas-liquid separation portion may include a columnar space through which refrigerant swirls and flows in the axial direction, and an introduction passage for guiding refrigerant to the columnar space. Furthermore, the introduction passage may be eccentrically connected to the columnar space as viewed form the axial direction, and the gas-liquid separation portion may be configured of a laminated structure obtained by laminating a plurality of plate members in the axial direction.

Furthermore, the gas-liquid separation portion may include a columnar space through which refrigerant swirls and flows in the axial direction and an introduction passage for guiding refrigerant to the columnar space, the introduction passage may be eccentrically connected to the columnar space as viewed form the axial direction, and the gas-liquid separation portion may be configured of a laminated structure obtained by laminating a plurality of plate members in the axial direction.

Thus, a circular hole and a long and thin hole are punched and stamped by press molding. This makes it possible to make the acute-angled corner between the circular hole and the long and thin hole in a sharp shape very small in curvature radius. For this reason, it is possible to efficiently convert the amount of motion of introduced refrigerant into the amount of rotational motion at the gas-liquid separation portion.

Furthermore, the plate members defining the gas-liquid separation portion may further include an end plate member adjoining to the flow-path formation plate member and having a flat surface closing at least a part of the circular hole.

Thus, it is possible to make the corner between a cylindrical surface and an end face forming a columnar space less prone to be rounded. Therefore, reduction in the swirl diameter of the columnar space by the corner can be suppressed. For this reason, it is possible to efficiently convert the amount of motion of introduced refrigerant into the amount of rotary motion at the gas-liquid separation portion.

Furthermore, the introduction passage may be connected to the outer circumferential portion of the columnar space in the tangential direction as viewed from the axial direction.

Thus, it is possible to increase the swirl ratio at the gas-liquid separation portion. Therefore, it is possible to stably produce a swirl flow even when the refrigerant flow amount is low and thus stably carry out gas-liquid separation. The evaporator unit may be further provided with a throttling mechanism located between the refrigerant dividing portion and the second evaporator and depressurizing the refrigerant flowing into the second evaporator. In this case, the throttling mechanism is integrally assembled to the integrated unit.

According to a second example of the present invention, an evaporator unit includes: a gas-liquid separation portion separating refrigerant into gas and liquid; and evaporators connected to an outlet side of the gas-liquid separation portion and evaporating the refrigerant flowing out of the gas-liquid separation portion. The gas-liquid separation portion includes a columnar space through which refrigerant swirls and flows in the axial direction, and an introduction passage guiding refrigerant into the columnar space. The introduction passage is eccentrically connected to the columnar space as viewed from the axial direction, and the gas-liquid separation portion is configured of a laminated structure obtained by laminating a plurality of plate members in the axial direction.

Accordingly, it is possible to efficiently convert the amount of kinetic of introduced refrigerant into the amount of rotation motion at the gas-liquid separation portion. Therefore, it is possible to stably produce a swirl flow even when the refrigerant flow amount is low and thus stably carry out gas-liquid separation.

For example, the plate members configuring the gas-liquid separation portion may include a flow-path formation plate member in which a circular hole forming the columnar space and a long and thin hole forming the introduction passage are formed. In this case, the flow-path formation plate member may have an acute-angled corner located between the circular hole and the long and thin hole. Furthermore, in the flow-path formation plate member, the circular hole and the long and thin hole may be punched during press molding.

According to a third example of the present invention, an evaporator unit includes: an ejector sucking refrigerant through a refrigerant suction port by a high-speed refrigerant flow jetted from a nozzle portion for depressurizing refrigerant, and mixing the sucked refrigerant sucked through the refrigerant suction port and the jetted refrigerant thereby pressurizing the refrigerant; a first evaporator evaporating the refrigerant flowing out of the ejector; and a second evaporator evaporating refrigerant and causing the refrigerant to flow out to the refrigerant suction port. In the evaporator unit, the first evaporator includes a plurality of outflow-side tubes through which refrigerant exchanging heat with air passes and an outflow-side tank portion adapted to distribute or collect refrigerant for the outflow-side tubes, the second evaporator includes a plurality of suction-side tubes through which refrigerant exchanging heat with air passes and a suction-side tank portion which adapted to distribute or collect refrigerant for the suction-side tubes, and the first evaporator and the second evaporator are arranged in series with each other with respect to the flow direction of air to be sent to a space to be cooled. Furthermore, the ejector, the outflow-side tank portion and the suction-side tank portion are arranged to be parallel with one another in its longitudinal directions, and the ejector, the first evaporator and the second evaporator are integrally assembled to form an integrated unit. In addition, a refrigerant inlet is provided at a part of the integrated unit located on one side in the longitudinal direction, such that a part of the refrigerant flowing through the refrigerant inlet flows into the nozzle portion, and the refrigerant flowing out of the ejector flows into an outflow-side passage formed in the outflow-side tank portion. The refrigerant flowing out of the outflow-side passage flows, from the outflow-side tubes on the other side connected to the part of the outflow-side tank portion located on the other side in the longitudinal direction among the plurality of outflow-side tubes, to the outflow-side tubes on one-end side connected to the part of the outflow-side tank portion located on one side in the longitudinal direction among the plurality of outflow-side tubes. The remaining refrigerant of the refrigerant flowing into the refrigerant inlet flows into the suction-side tubes on one-end side connected to the part of suction-side tank portion located on one side in the longitudinal direction among the plurality of suction-side tubes and flows out of the suction-side tubes on the other-end side connected to the part of the suction-side tank portion located on the other side in the longitudinal direction among the plurality of suction-side tubes. Furthermore, the refrigerant flowing out of the suction-side tubes on the other end-side flows into a suction-side passage formed in the suction-side tank portion, and the refrigerant in the suction-side passage is sucked into the refrigerant suction port.

Accordingly, the superheat area of the first evaporator is formed on one end side of the ejector in the longitudinal direction, and the superheat area of the second evaporator is formed on the other end side of the ejector in the longitudinal direction. Therefore, the superheat area of the first evaporator and the superheat area of the second evaporator do not overlap with each other. For this reason, the production of temperature distribution in air blown out can be sufficiently suppressed.

A refrigerant flow path for guiding refrigerant flowing out of the ejector to the first evaporator is formed of an outflow-side passage formed in an outflow-side tank portion without use of a refrigerant pipe. Therefore, it is possible to suppress pressure loss in refrigerant whose pressure was raised at the ejector. As a result, it is possible to sufficiently obtain the cycle efficiency enhancement effect by the ejector, that is, the COP enhancement effect by reduction of the consumed power of the compressor.

For example, the second evaporator may include a partitioning portion which partitions at least a part of the inner space in the suction-side tank portion into a tube-side space located on the side closer to the suction-side tubes and an anti-tube-side space located on the side farther away from the suction-side tubes. In this case, the suction-side passage is configured of the anti-tube-side space. Therefore, the suction-side passage can be formed with a simple structure.

In the evaporator unit, the following relation may be satisfied: $Ai2 \leq Ai1 \leq Ao$. Here, Ao is a sectional area (i.e., vertical sectional area) of a space formed in the outflow-side tank portion into which the refrigerant flowing out of the ejector flows in a section perpendicular to the longitudinal direction, Ai1 is a sectional area of the suction-side passage in a section perpendicular to the longitudinal direction, and Ai2 is a sectional area of the tube-side space in a section perpendicular to the longitudinal direction.

Accordingly, the vertical sectional areas of the outflow-side tank portion, suction-side passage and tube-side space in the longitudinal direction are increased according to the order in which refrigerant flows. Therefore, the sectional areas are increased based on the velocity of refrigerant flow. This is because in the first evaporator and the second evaporator, the velocity of flow is increased as refrigerant is evaporated and the dryness is increased.

Therefore, the sectional areas are increased based on the velocity of refrigerant flow. This makes it possible to suppress increase in pressure loss in conjunction with increase in the velocity of refrigerant flow and thus enhance performance.

Furthermore, a tube number of the suction-side tubes on the other-end side may be equal to or larger than a tube number of the suction-side tubes on the one-end side. Furthermore, the tube number of the outflow-side tubes on one-end side maybe equal to or larger than the tube number of the outflow-side tubes on the other-end side.

The evaporator unit may be further provided with a joint in which the refrigerant inlet is formed. The joint may be configured to define therein an inflow passage for causing the refrigerant flowing into the refrigerant inlet to flow toward the nozzle portion and the suction-side tube on the one-end side, and the joint may be disposed on the one end side of the ejector.

The evaporator unit may be further provided with a housing tank portion different from the outflow-side tank portion and the suction-side tank portion, and housing the ejector. In this case, the outflow-side tank portion may be provided with an outflow-side through hole penetrating the outflow-side tank portion from the inner circumferential surface thereof to the outer circumferential surface thereof, the housing tank portion may be provided with an outflow-side communication hole penetrating the housing tank portion from the inner circumferential surface thereof to the outer circumferential surface thereof and communicating with the outflow-side through hole, the inner space in the housing tank portion may communicate with the inner space in the outflow-side tank portion through the outflow-side through hole and the outflow-side communication hole, a rib protruded in the direction of assembly of the housing tank portion to the outflow-side tank portion may be formed at an opening edge portion of the outflow-side communication hole, and the rib may be inserted into the outflow-side through hole.

Because the rib protrudes along the direction of assembly of the housing tank portion with respect to the outflow-side communication hole, assembly performance of the housing tank portion can be effectively increased.

BRIEF DESCRIPTION OF THE DRAWINGS

Additional objects and advantages of the present invention will be more readily apparent from the following detailed description of preferred embodiments when taken together with the accompanying drawings. In which:

FIG. 19A is an exploded perspective view of an integrated unit in a second embodiment;

FIG. 19B is an exploded perspective view illustrating the joint of the integrated unit in FIG. 19A;

EMBODIMENTS

Figure 1:
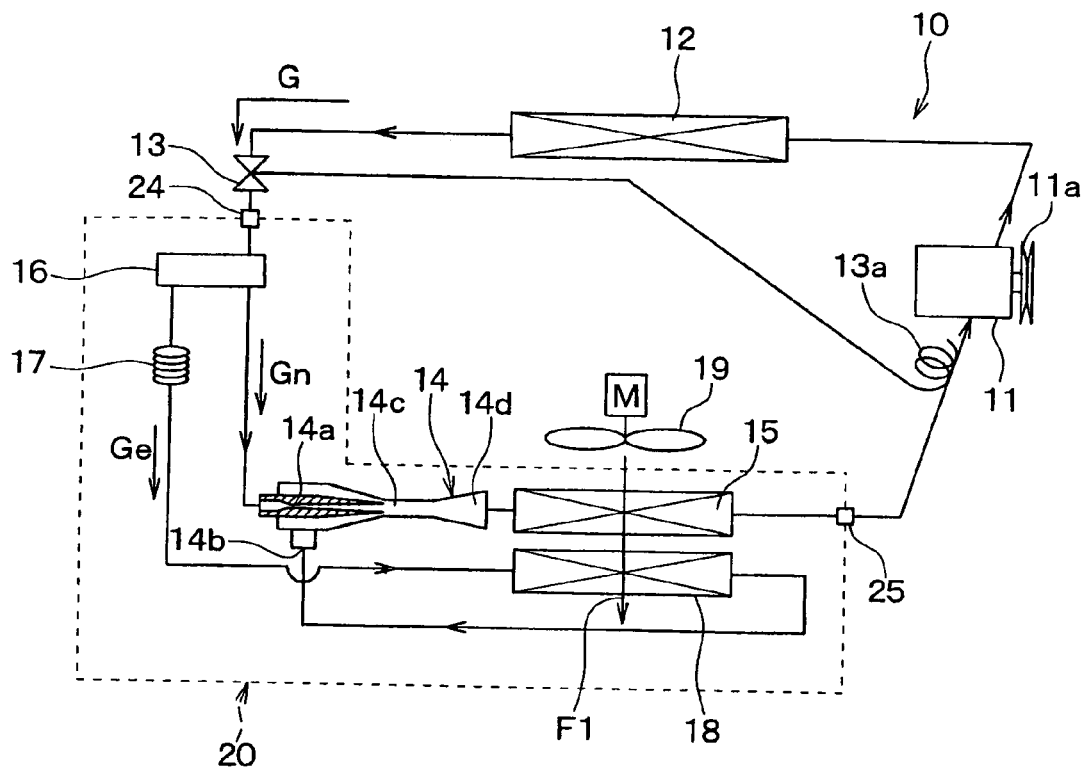
FIG. 1 is an overall schematic diagram of an ejector refrigeration cycle in a first embodiment.

Embodiments of the present invention will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

Hereafter, description will be given to the first embodiment of the invention. FIG. 1 illustrates an example in which an ejector refrigeration cycle 10 in the first embodiment is applied to a refrigeration cycle device for vehicles.

In the ejector refrigeration cycle 10 illustrated in FIG. 1, a compressor 11 that sucks and compresses refrigerant is rotationally driven by an engine for vehicle running, not shown, through an electromagnetic clutch 11a, a belt, and the like.

Either of the following compressors may be used for the compressor 11: a variable displacement compressor whose refrigerant discharge capacity can be varied by change in discharge capacity; and a fixed displacement compressor whose refrigerant discharge capacity is adjusted by engaging and disengaging the electromagnetic clutch 11a to vary the operating ratio of compressor operation. When an electric compressor is used as the compressor 11, the refrigerant discharge capacity can be adjusted by adjusting the number of revolutions of an electric motor.

A radiator 12 is disposed at the refrigerant discharge side of the compressor 11. The radiator 12 exchanges heat between high-pressure refrigerant discharged from the compressor 11 and outside air (i.e., air outside of the vehicle) sent by a cooling fan (not shown), thereby cooling the high-pressure refrigerant.

In the present embodiment, a refrigerant, like fluorocarbon refrigerants, HC fluorocarbon refrigerants, and the like, whose high pressure does not exceed a critical pressure is used as the refrigerant. Therefore, the ejector refrigeration cycle 10 constitutes a vapor pressure sub-critical cycle. Therefore, the radiator 12 functions as a condenser that cools and condenses the refrigerant.

A temperature expansion valve 13 is disposed on the outlet side of the radiator 12. This temperature expansion valve 13 is a depressurizing means for depressurizing liquid refrigerant from the radiator 12 and has a temperature sensing part 13a placed in a refrigerant suction-side passage of the compressor 11.

The temperature expansion valve 13 detects the degree of superheat of the compressor suction-side refrigerant based on the temperature and pressure of the suction-side refrigerant (the evaporator outlet-side refrigerant described later) of the compressor 11. It then adjusts the valve opening (refrigerant flow amount) so that the degree of superheat of the compressor suction-side refrigerant becomes equal to a preset predetermined value.

An ejector 14 is disposed on the refrigerant outlet side of the temperature expansion valve 13. This ejector 14 is a depressurizing means for depressurizing refrigerant. At the same time, it is a liquid transportation and refrigerant circulating means (kinetic amount transport pump) for circulating refrigerant by the suction (engulfing) of a refrigerant flow jetted at high speed.

The ejector 14 includes: a nozzle portion 14a that reduces the area of the passage for refrigerant (intermediate-pressure refrigerant) that passed through the temperature expansion valve 13 to further depressurize and expand the refrigerant; and a refrigerant suction port 14b that is disposed in the same space as the refrigerant jet hole of the nozzle portion 14a and sucks gas-phase refrigerant from a second evaporator 18.

In the part of the ejector 14 on the downstream side of the nozzle portion 14a and the refrigerant suction port 14b in the refrigerant flow, a mixing portion 14c is provided. The mixing portion 14c mixes together a high-speed refrigerant flow from the nozzle portion 14a and the suction refrigerant drawn from the refrigerant suction port 14b. A diffuser portion 14d forming a pressurizing portion is disposed downstream of the mixing portion 14c in the refrigerant flow. This diffuser portion 14d is formed in such a shape that the area of the refrigerant passage is gradually increased. It functions to decelerate a refrigerant flow and to increase the refrigerant pressure, that is, it functions to convert the speed energy of refrigerant into pressure energy.

A first evaporator 15 is connected to the outlet portion of the ejector 14 (the downstream end of the diffuser portion 14d). The refrigerant outlet side of the first evaporator 15 is connected to the suction side of the compressor 11.

On the refrigerant outlet side of the temperature expansion valve 13, a flow amount divider 16 is disposed. The flow amount divider 16 adjusts the flow amount Gn of refrigerant flowing into the nozzle portion 14a of the ejector 14 and the flow amount Ge of refrigerant flowing into the refrigerant suction port 14b of the ejector 14.

The flow amount divider 16 divides the refrigerant that having passed through the temperature expansion valve 13 into the inlet side of the nozzle portion 14a of the ejector 14 and the inlet side of the refrigerant suction port 14b of ejector 14.

A throttling mechanism 17 and the second evaporator 18 are arranged between the flow amount divider 16 and the refrigerant suction port 14b of the ejector 14. The throttling mechanism 17 is a depressurizing means that functions to adjust the flow amount of refrigerant to the second evaporator 18 and is disposed on the inlet side of the second evaporator 18.

In the present embodiment, the two evaporators 15, 18 are assembled into an integral structure. The two evaporators 15, 18 are housed in a case, not shown. Air (air to be cooled) is sent to the air passages formed in the case as indicated by arrow F1 by a common electric blower 19 and the sent air is cooled by the two evaporators 15, 18.

Cool air cooled through the two evaporators 15, 18 is sent into a common space (not shown) to be cooled and the common space to be cooled is thus cooled by the two evaporators 15, 18.

That is, the two evaporators 15, 18 are arranged in series with each other with respect to the flow of air sent to the space to be cooled. More specific description will be given. Of the two evaporators 15, 18, the first evaporator 15 connected to the main flow path located downstream of the ejector 14 is disposed upstream of the air flow F1 (windward side); and the second evaporator 18 connected to the refrigerant suction port 14b of the ejector 14 is disposed downstream of the air flow F1 (leeward side).

When the ejector refrigeration cycle 10 in the present embodiment is applied to a refrigeration cycle device for vehicle air conditioning, the space in the vehicle compartment is the space to be cooled. When the ejector refrigeration cycle 10 in the present embodiment is applied to a refrigeration cycle device for refrigerator vehicles, the space in the refrigerator-freezer of a refrigerator vehicle is the space to be cooled.

In the present embodiment, the ejector 14, the first and second evaporators 15, 18, the flow amount divider 16, and the throttling mechanism 17 are assembled together as one integrated unit (an evaporator unit) 20. Description will be given to concrete examples of the integrated unit 20 with reference to FIG. 2 to FIG. 7.

Figure 2:
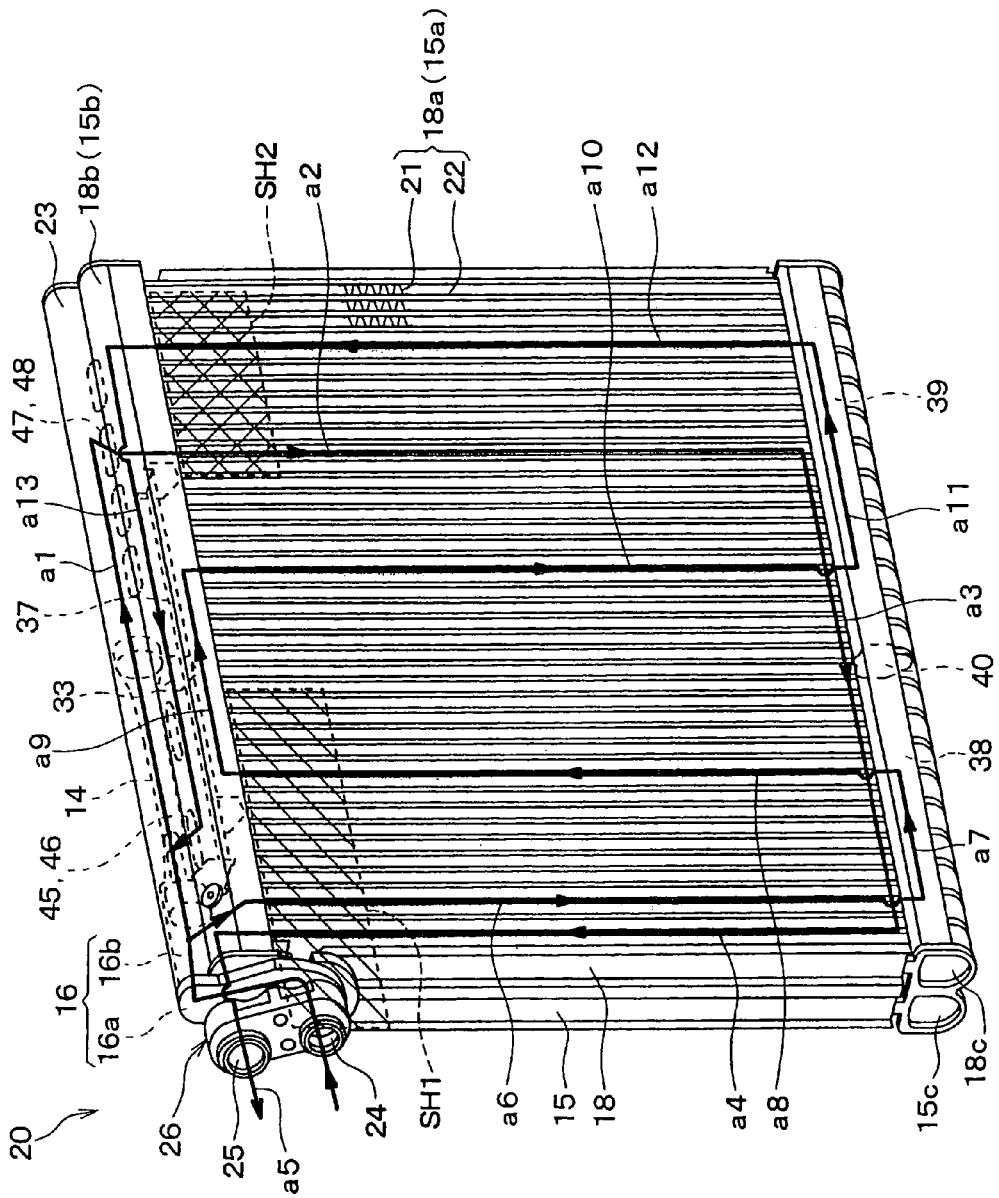
FIG. 2 is a perspective view of an integrated unit in the first embodiment.

FIG. 2 is a perspective view of the integrated unit 20. In this example, two evaporators 15, 18 are integrated as one evaporator structure. For this reason, the first evaporator 15 constitutes the area of the one evaporator structure located on the upstream side of the air flow F1; and the second evaporator 18 constitutes the area of the one evaporator structure located on the downstream side of the air flow F1.

The first evaporator 15 and the second evaporator 18 are identical in basic configuration and they respectively include: heat exchange core portions 15a, 18a; and tank portions 15b, 15c, 18b, 18c positioned both above and below the heat exchange core portions 15a, 18a and extended in the horizontal direction.

The heat exchange core portions 15a, 18a are respectively provided with multiple heat exchange tubes 21 which are extended in the vertical direction and through which refrigerant is circulated. A passage through which air to be cooled as a heat-exchanged medium passes is formed between the tubes 21.

A fin 22 joined with the tubes 21 is disposed between the tubes 21. The tubes 21 and the fins 22 are alternately laminated and arranged in the left and right directions of the heat exchange core portions 15a, 18a and the heat exchange core portions 15a, 18a are formed of a laminated structure of the tubes 21 and the fins 22. The heat exchange core portions 15a, 18a may be formed of a configuration of only the tubes 21 without the fins 22.

In FIG. 2, only some of the fins 22 are shown; however, the fins 22 are disposed throughout the heat exchange core portions 15a, 18a and a laminated structure of the tubes 21 and the fins 22 is configured throughout the heat exchange core portions 15a, 18a. Sent air from the electric blower 19 is passed through the gaps in the laminated structure.

The tubes 21 constitute a refrigerant passage and they are formed of flat tubes whose cross-sectional shape is flat along the direction of the air flow F1. Each of the fins 22 is a corrugated fin formed by bending and forming a thin plate material into a wave-like shape and is joined to the flat outer surfaces of the tubes 21 to expand the air-side heat transmission area.

The tubes 21 of the heat exchange core portion 15a and the tubes 21 of the heat exchange core portion 18a constitute refrigerant passages independent of each other. Both the upper and lower tank portions 15b, 15c, 18b, 18c of the first and second evaporators 15, 18 constitute refrigerant passage spaces (tank spaces) independent of each other.

Both the upper and lower tank portions 15b, 15c of the first evaporator 15 include a tube fitting hole portions (not shown) to which both the upper and lower ends of the tubes 21 of the heat exchange core portion 15a are fitted and joined. Both the upper and lower ends of the tubes 21 communicate with the inner spaces of the tank portions 15b, 15c.

Similarly, both the upper and lower tank portions 18b, 18c of the second evaporator 18 include a tube fitting hole portions (not shown) to which both the upper and lower ends of the tubes 21 of the heat exchange core portion 18a are fitted and joined. Both the upper and lower ends of the tubes 21 communicate with the inner spaces of the tank portions 18b, 18c.

Thus, the upper and lower tank portions 15b, 15c, 18b, 18c respectively function to divide a refrigerant flow into the multiple tubes 21 of the corresponding heat exchange core portions 15a, 18a and congregate refrigerant flows from the multiple tubes 21.

Of the upper tank portions 15b, 18b, the surfaces on the opposite side to the tubes 21 (the upper surfaces in FIG. 2 and FIG. 3) are provided with a housing tank portion 23 that houses the ejector 14.

The ejector 14 and the housing tank portion 23 are in a long and thin shape and extend in the direction of the axis of the nozzle portion 14a. The ejector 14 and the housing tank portion 23 are arranged in a valley formed between the upper tank portions 15b, 18b so that the longitudinal direction of the ejector 14 and the housing tank portion 23 is parallel with the longitudinal direction of the upper tank portions 15b, 18b (horizontal direction).

More specifically, the ejector 14 and the housing tank portion 23 are arranged so that the inlet portion of the ejector 14 formed at one end of the ejector 14 in the longitudinal direction faces toward one ends of the upper tank portions 15b, 18b in the longitudinal direction; and the outlet portion of the ejector 14 formed at the other end of the ejector 14 in the longitudinal direction faces toward the other ends of the upper tank portions 15b, 18b in the longitudinal direction.

Aluminum, that is a metal excellent in thermal conductivity and brazability, is most suitable for the material of evaporator components, such as the tubes 21, fins 22, and tank portions 15b, 15c, 18b, 18c. The overall configuration of the first and second evaporators 15, 18 can be assembled by brazing, by forming each part of aluminum material.

In addition, the ejector 14 and the housing tank portion 23 are also formed of aluminum material and assembled integrally with the first and second evaporators 15, 18 by brazing.

The refrigerant inlet 24 and the refrigerant outlet 25 of the integrated unit 20 are formed in a joint 26. The joint 26 is provided at the ends of the upper tank portions 15b, 18b of the first and second evaporators 15, 18 (the left end portion in FIG. 2 and FIG. 3) in the longitudinal direction.

The joint 26 is formed of aluminum material similarly to the evaporator parts, and is fixed to the side surfaces of the upper tanks 15b, 18b by brazing.

The refrigerant inlet 24 of the joint 26 communicates with the inlet portion of the ejector 14 and the refrigerant outlet 25 of the joint 26 communicates with one end portion of the inner space in the upper tank portion 15b in the longitudinal direction.

Figure 4:
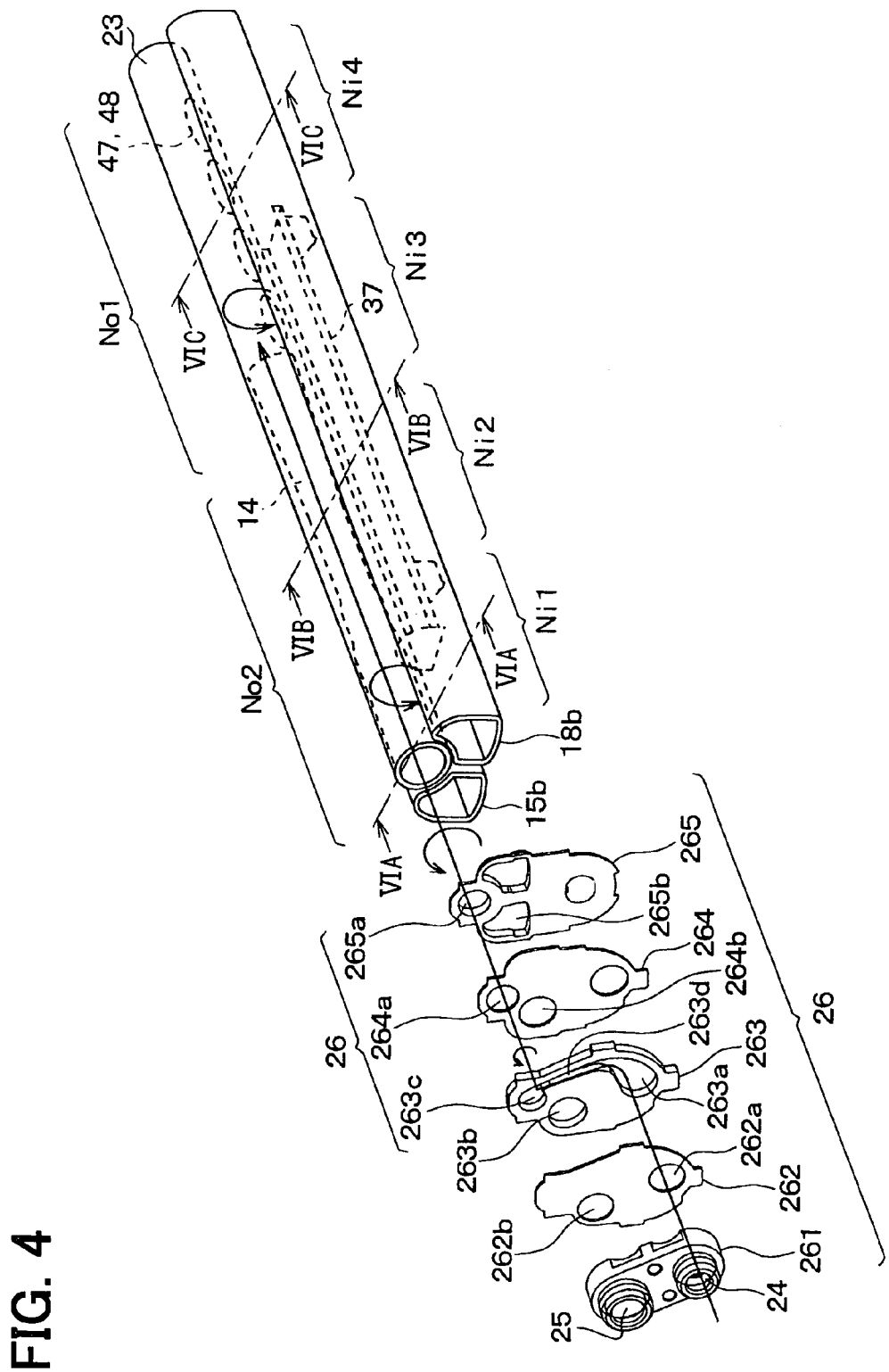
FIG. 4 is an exploded perspective view illustrating a part of the integrated unit in FIG. 2.

In the present embodiment, the joint 26 is formed by laminating a block member 261 with the refrigerant inlet 24 and the refrigerant outlet 25 formed therein and multiple (four in the example in FIG. 4) plate members 262, 263, 264, 265 as illustrated in FIG. 4.

In the plate members 262 to 265, there are provided with inflow passage ports 262a, 263a, 264a, 265a forming an inflow passage through which refrigerant from the refrigerant inlet 24 flows, and outflow passage ports 262b, 263b, 264b, 265b forming an outflow passage through which refrigerant flows to the refrigerant outlet 25.

In the flow-path formation plate member 263 located in the intermediate position of the four plate members 262 to 265, the inflow passage port 263a is configured by a circular hole 263c and a long and thin hole 263d connected to the outermost circumferential portion of the circular hole 263c in the tangential direction. Meanwhile, the inflow passage ports 262a, 264a, 265a in the remaining plate members 262, 264, 265 are configured by circular holes.

Of the remaining plate members 262, 264, 265, the end plate member 262 adjacent to the flow-path formation plate member 263 has a flat surface that closes at least part of the circular hole 263c in the flow-path formation plate member 253. In the present embodiment, the flat surface of the end plate member 262 completely closes the circular hole 263c in the flow-path formation plate member 263.

The circular holes 263c, 264a, 265a in the plate members 263 to 265 form a columnar space extended in the direction of the lamination of the plate members 262 to 265. The columnar space 263c, 264a, 265a and the long and thin hole 263d define the gas-liquid separation portion 16a of the flow amount divider 16.

The gas-liquid separation portion 16a functions as a swirl flow generation mechanism that causes a refrigerant flow passing through the inflow passage to swirl. The long and thin hole 263d functions as an introduction passage for guiding refrigerant from the refrigerant inlet 24 to the gas-liquid separation portion 16a.

Figure 5:
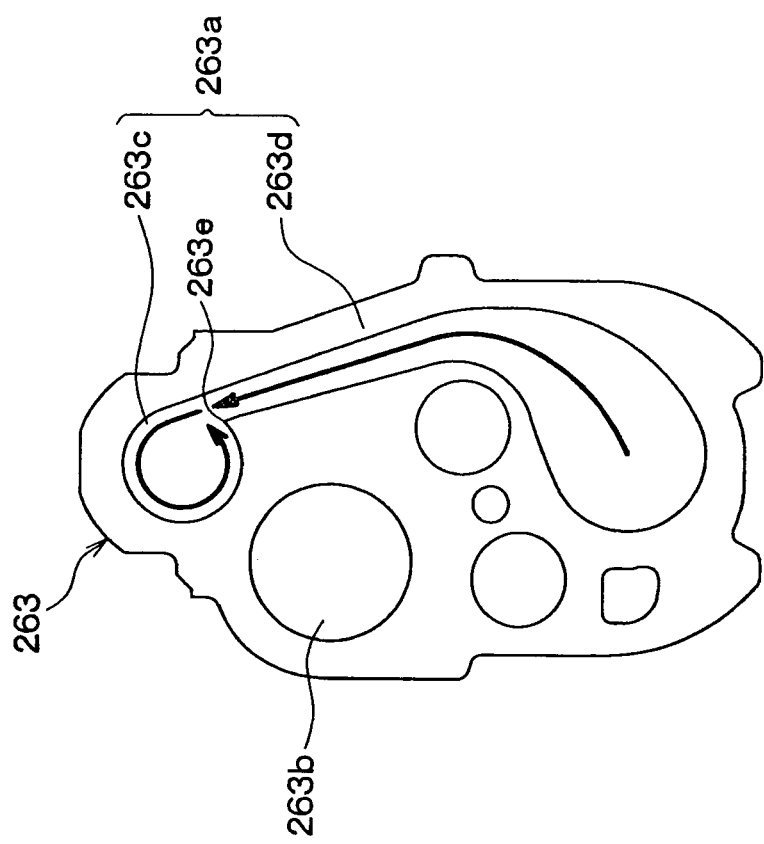
FIG. 5 is a front view illustrating a plate member in FIG. 2.
Figure 6:
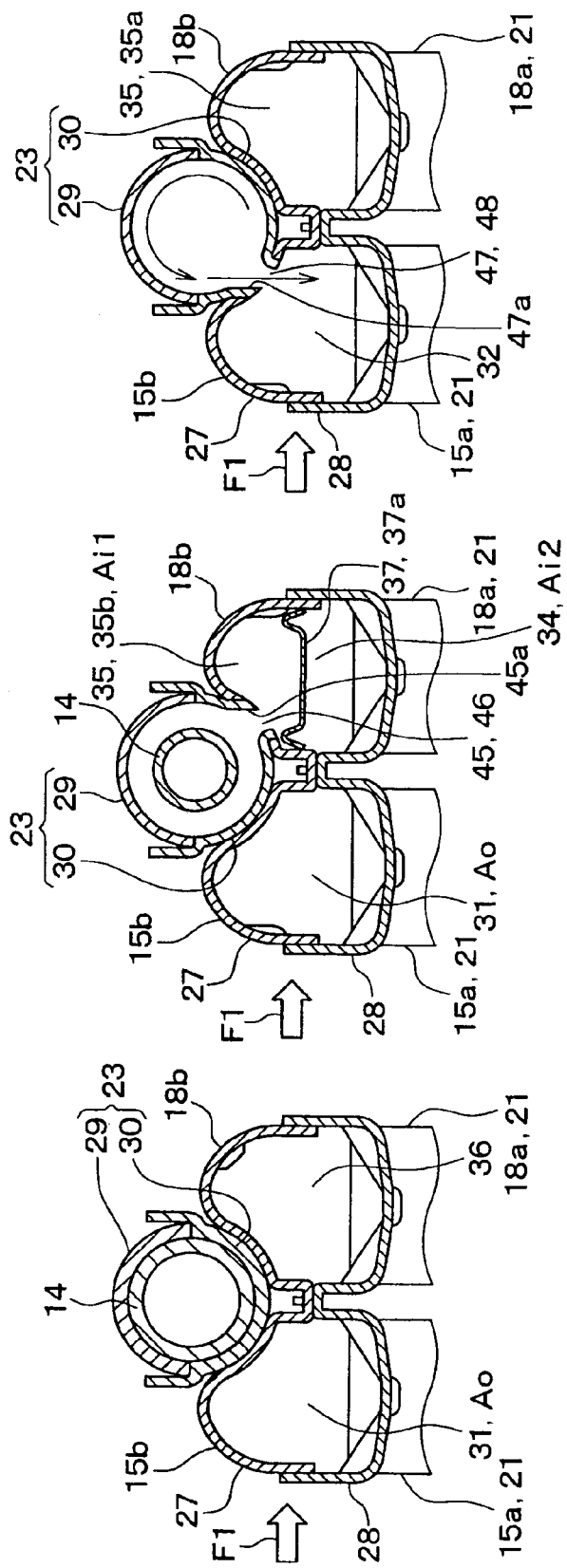
FIG. 6A is a sectional view taken along line VIA-VIA of FIG. 4.
FIG. 6B is a sectional view taken along line VIB-VIB of FIG. 4.
FIG. 6C is a sectional view taken along line VIC-VIC of FIG. 4.

As illustrated in FIG. 5, refrigerant from the refrigerant inlet 24 flows into the outermost circumferential portion of the gas-liquid separation portion 16a in the tangential direction. Therefore, the refrigerant in two phase, gas and liquid, that flowed into the gas-liquid separation portion 16a swirls and flows along the cylindrical surface of the gas-liquid separation portion 16a. As a result, a liquid film is formed on the cylindrical surface of the gas-liquid separation portion 16a.

For this reason, refrigerant can be separated into gas and liquid utilizing centrifugal force at the gas-liquid separation portion 16a.

An acute-angled corner 263e located between the circular hole 263c and the long and thin hole 263d is in a sharp shape with a very small curvature radius. The corner 263e with a very small curvature radius can be formed by punching the circular hole 263c and the long and thin hole 263d in the flow-path formation plate member 263 during press molding.

The outer peripheral portion (rim) of the outlet portion of the gas-liquid separation portion 16a of the joint 26 is joined to one end of the housing tank portion 23 by brazing. Since the one end of the housing tank portion 23 is open, refrigerant separated into gas and liquid at the gas-liquid separation portion 16a flows into one end (inlet portion) of the ejector 14.

The one end (inlet portion) of the ejector 14 is provided with the refrigerant dividing portion 16b of the flow amount divider 16. The refrigerant dividing portion 16b functions to divide refrigerant, separated into gas and liquid at the gas-liquid separation portion 16a, into the nozzle portion 14a side of the ejector 14 and the second evaporator 18 side.

More specific description will be given. The refrigerant, that is high in dryness, in the gas and liquid two phases, flowing through the center of the refrigerant dividing portion 16b flows into the nozzle portion 14a of the ejector 14. The refrigerant, that is low in dryness, in liquid phase flowing along the peripheral portion of the refrigerant dividing portion 16b flows into the upper tank portion 18b of the second evaporator 18 through a throttle hole (not shown) formed in the cylindrical surface of the ejector 14. The throttle hole of the ejector 14 constructs the throttling mechanism 17.

Figure 7:
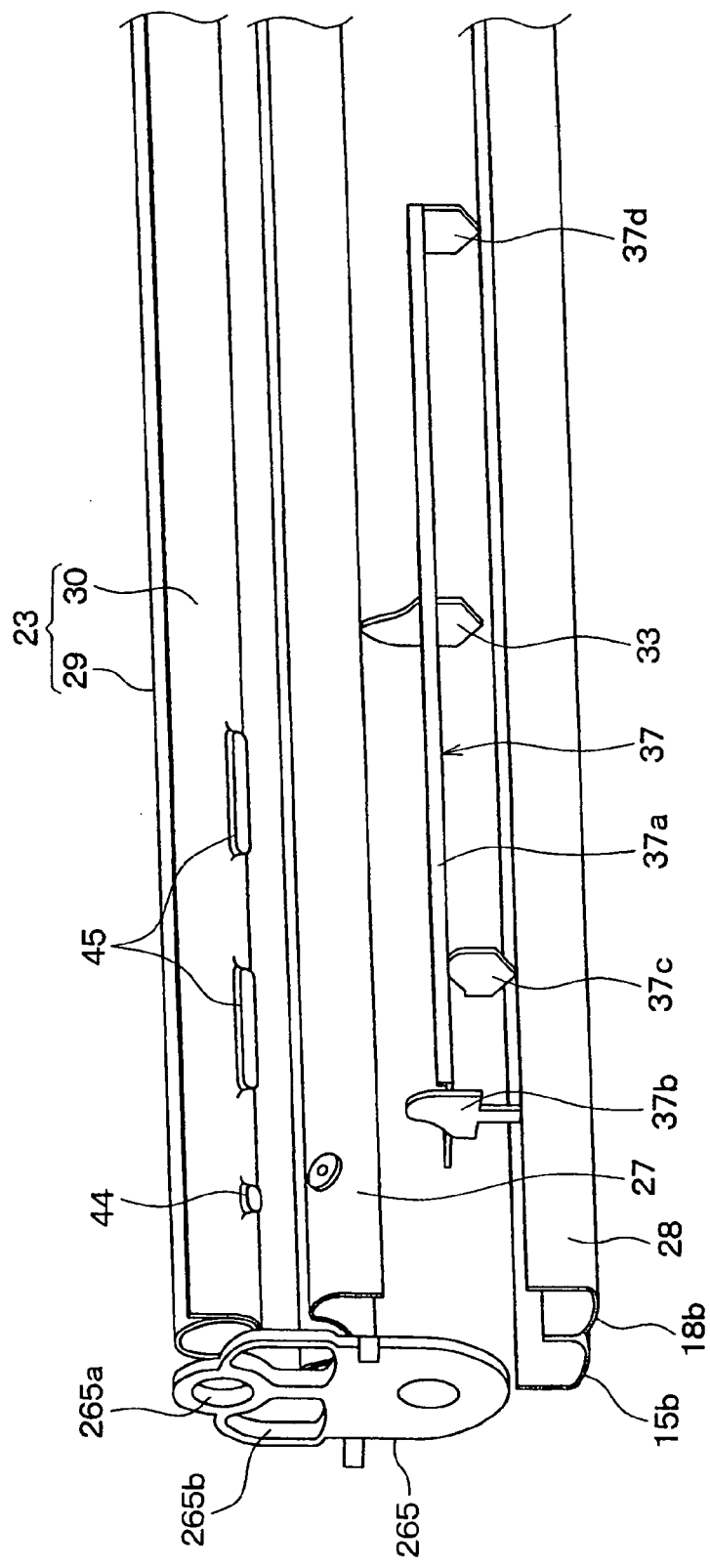
FIG. 7 is an exploded perspective view of the upper tank portion in FIG. 4.

FIGS. 6A to 6C are respectively a sectional view taken along line VIA-VIA of FIG. 4, a sectional view taken along line VIB-VIB of FIG. 4, and a sectional view taken along line VIC-VIC of FIG. 4. FIG. 7 is an exploded perspective view of the upper tank portions 15b, 18b.

In the present embodiment, the upper tank portions 15b, 18b are divided into two parts of an upper member 27 and a lower member 28 before molding, and the housing tank portion 23 is divided into two half cylindrical members 29, 30 vertically positioned.

In the upper tank portion 15b of the first evaporator 15, a partitioning plate 33 is disposed to partition the inner space in the upper tank portion 15b into a first space 31 located on one side in the longitudinal direction and a second space 32 located on the other side in the longitudinal direction.

The first space 31 functions as a collection tank that collects refrigerant having passed through the tubes 21 of the first evaporator 15. The second space 32 functions as a distribution tank that distributes refrigerant to the tubes 21 of the first evaporator 15 and as an outflow-side passage through which refrigerant flowing out of the ejector 14 flows.

In the upper tank portion 18b of the second evaporator 18, there is provided a partitioning portion 37 that partitions the inner space in the upper tank portion 18b into three spaces, first to third spaces 34 to 36. The partitioning portion 37 is formed of aluminum material similarly to the evaporator parts and is fixed on the inner wall surface of the upper tank 18b by brazing.

The partitioning portion 37 includes one partitioning plate 37a extending in parallel with the longitudinal direction of the upper tank portion 18b, and three partitioning plates 37b, 37c, 37d extending in the direction orthogonal to the longitudinal direction of the upper tank portion 18b. In other words, the partitioning plate 37a is extended in the direction vertical to the longitudinal direction of the tubes 21.

The first space 34 is a space extending in the longitudinal direction of the upper tank portion 18b in a center area of the upper tank portion 18b in the longitudinal direction. It functions both as a collection tank for collecting refrigerant having passed through the tubes 21 of the second evaporator 18 and as a distribution tank for distributing refrigerant to the tubes 21 of the second evaporator 18.

The second space 35 is a space extended from the center area of the upper tank portion 18b in the longitudinal direction to the other end portion thereof in the longitudinal direction. The second space 35 is divided from the first space 34 by the partitioning plates 37a, 37d of the partitioning portion 37.

The second space 35 includes a collection space 35a positioned laterally to the first space 34 and formed throughout the section of the upper tank portion 18b; and a suction-side space 35b positioned above the first space 34.

The collection space 35a functions as a collection tank portion for collecting refrigerant having passed through the tubes 21 of the second evaporator 18, and the suction-side space 35b functions as a suction-side passage for guiding the refrigerant collected in the collection space 35a to the refrigerant suction port 14b of the ejector 14.

The partitioning plate 37a of the partitioning portion 37 is disposed to partition the inner space in the upper tank portion 18b into the first space (tube-side space) 34 located closer to the tubes 21 (lower side) and the suction-side space (anti-tube-side space) 35b located farther away from the tubes 21 (upper side).

The third space 36 is formed at the other end portion of the upper tank portion 18b in the longitudinal direction. The third space 36 functions as an internal passage for guiding refrigerant having passed through the throttling mechanism 17 and as a distribution tank portion for distributing the guided refrigerant to the tubes 21 of the second evaporator 18.

In the lower tank portion 18c of the second evaporator 18, a partitioning plate 40 is fixed by brazing. The partitioning plate 40 partitions the inner space in the lower tank portion 18c into a first space 38 located on one side in the longitudinal direction and a second space 39 located on the other side in the longitudinal direction.

The first space 38 functions as a collection tank portion for collecting refrigerant having passed through the tubes 21 of the second evaporator 18; and the second space 39 functions as a distribution tank portion for distributing the refrigerant to the tubes 21 of the second evaporator 18.

In the housing tank portion 23, there is formed a communication hole 44 that penetrates it from its inner circumferential surface to its outer circumferential surface and communicates with the throttling mechanism 17 formed on the cylindrical surface of the ejector 14. The communication hole 44 overlaps with a through hole (not shown) penetrating the upper tank portion 18b from its inner circumferential surface to its outer circumferential surface. As a result, the throttling mechanism 17 communicates with the third space 36 in the upper tank portion 18b.

In the housing tank portion 23, as illustrated in FIG. 6B, there is similarly formed a communication hole 45 that penetrates it from its inner circumferential surface to its outer circumferential surface and communicates with the refrigerant suction port 14b of the ejector 14. The communication hole 45 overlaps with a through hole 46 formed in the upper tank portion 18b. As a result, the passage space 35b in the upper tank portion 18b communicates with the refrigerant suction port 14b of the ejector 14. In the present embodiment, there are provided multiple communication holes 45 and through holes 46.

In the housing tank portion 23, as illustrated in FIG. 6C, there is formed an outflow-side communication hole 47. The communication hole 47 penetrates it from its inner circumferential surface to its outer circumferential surface and communicates with the outlet portion of the diffuser portion 14d of the ejector 14. This outflow-side communication hole 47 overlaps with an outflow-side through hole 48 that penetrates the upper tank portion 15b from its inner circumferential surface to its outer circumferential surface. As a result, the outlet portion of the diffuser portion 14d of the ejector 14 communicates with the second space 32 in the upper tank portion 15b. In the present embodiment, there are provided multiple outflow-side communication holes 47 and outflow-side through holes 48.

As illustrated in FIGS. 6B and 6C, ribs 45a, 47a protruded outward of the housing tank portion 23 are formed at the opening edge portions of the communication holes 45, 47 of the housing tank portion 23. The rib 45a, 47a are formed when the communication holes 45, 47 are formed in the housing tank portion 23 by burring.

The ribs 45a, 47a are protruded toward the direction in which the housing tank portion 23 is assembled to the upper tank portion 15b. In other words, the ribs 45a, 47a are protruded in the direction of the tangent to the cylindrical surface of the housing tank portion 23.

In the present embodiment, as illustrated in FIG. 7, a rib similar to the rib 45a, 47a is also formed at the opening edge portion of the communication hole 44 in the housing tank portion 23.

In the first and second evaporators 15, 18, the velocity of flow is increased so as to increase the pressure loss as the refrigerant is evaporated and its dryness is increased. In the present embodiment, increase in pressure loss in conjunction with increase in the velocity of refrigerant flow is suppressed by increasing the sectional area according to the velocity of refrigerant flow.

Specifically, the sectional areas are so set that the following relation is satisfied:

$$Ai2 \leq Ai1 \leq Ao$$

where, as illustrated in FIGS. 6A to 6C, Ao is a sectional area (vertical sectional area) of the inner space in the upper tank portion 15b in a section vertical to the longitudinal direction, Ai1 is a sectional area (vertical sectional area) of the passage space 35b in the second space 35 within the upper tank portion 18b in a section vertical to the longitudinal direction, and Ai2 is a sectional area (vertical sectional area) of the first space 34 in the upper tank portion 18b in a section vertical to the longitudinal direction.

Further, the numbers of tubes are so set that the following relation is satisfied:

$$No1 \leq No2$$

where, as illustrated in FIG. 4, No1 is the tube number in the group of the tubes 21, connected to the second space 32 in the upper tank portion 15b; and No2 is the tube number in the group of the tubes 21, connected to the first space 31 in the upper tank portion 15b.

In addition, the numbers of tubes are so set that the following relation is satisfied:

$$Ni1 \leq Ni2 \leq Ni3 \leq Ni4$$

where, Ni1 is the tube number in the group of the tubes 21, connected to the third space 36 in the upper tank portion 18b; Ni2 is the tube number in the group of the tubes 21, connected to the first space 34 in the upper tank portion 18b and the first space 38 in the lower tank portion 18c, Ni3 is the tube number in the group of the tubes 21, connected to the first space 34 in the upper tank portion 18b and the second space 39 in the lower tank portion 18c; and Ni4 is the tube number in the group of the tubes 21, connected to the second space 35 in the upper tank portion 18b.

Concrete description will be given to the refrigerant flow path in the entire integrated unit 20 having the above configuration with reference to FIG. 2 and FIG. 3. Refrigerant flowing through the refrigerant inlet 24 of the joint 26 swirls and flows along the cylindrical surface of the gas-liquid separation portion 16a and it is separated into gas and liquid by the centrifugal force of the swirl flow.

Figure 8:
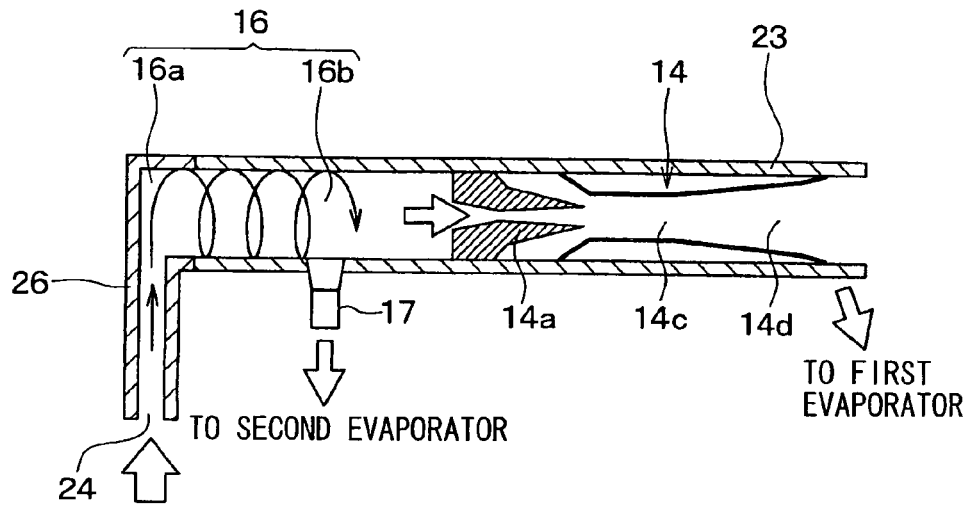
FIG. 8 is a sectional view illustrating a joint, a housing member, and an ejector of the integrated unit in FIG. 2.

As a result, as illustrated in FIG. 8, the flow of refrigerant that flowed into the gas-liquid separation portion 16a of the joint 26 flows on the center side of the gas-liquid separation portion 16a and is branched into a refrigerant flow in two phases, gas and liquid, going toward the nozzle portion 14a of the ejector 14 in the housing tank portion 23; and a refrigerant flow in liquid phase flowing along the cylindrical surface of the gas-liquid separation portion 16a and going toward the throttling mechanism 17 formed on the cylindrical surface of the ejector 14.

The refrigerant in gas and liquid two-phases, flowing toward the nozzle portion 14a of the ejector 14 passes through the ejector 14 (nozzle portion 14a→mixing portion 14c→diffuser portion 14d) and is depressurized. After the depressurization, the low-pressure refrigerant passes through the inner space in the housing tank portion 23 and flows into the second space 32 in the upper tank portion 15b of the first evaporator 15 as indicated by arrow a1.

The refrigerant in the second space 32 flows down through the multiple tubes 21 at the right part of the heat exchange core portion 15a as indicated by arrow a2 and flows into the right part of the lower tank portion 15c. Since the lower tank portion 15c is not provided with a partitioning plate, the refrigerant moves from the right part of the lower tank portion 15c to the left part as indicated by arrow a3.

The refrigerant at the left part of the lower tank portion 15c moves up through the tubes 21 at the left part of the heat exchange core portion 15a as indicated by arrow a4. Then, the refrigerant flows into the first space 31 in the upper tank portion 15b and the refrigerant further flows to the refrigerant outlet 25 as indicated by arrow a5.

Meanwhile, the refrigerant in liquid phase flowing toward the throttling mechanism 17 in the housing tank portion 23 passes through the throttling mechanism 17 and is depressurized. After the depressurization, the low-pressure refrigerant (refrigerant in gas and liquid two phases) flows into the first space 34 in the upper tank portion 18b of the second evaporator 18.

The refrigerant that flowing into the first space 34 moves down through the tubes 21 at the left part of the heat exchange core portion 18a as indicated by arrow a6. Then, the refrigerant flows into the left part of the first space 34 in the lower tank portion 18c. The refrigerant moves from the left part of the first space 34 to the right part of the first space 34 as indicated by arrow a7.

The refrigerant at the right part of the first space 34 in the lower tank portion 18c moves up through the tubes 21 at the center left part of the heat exchange core portion 18a as indicated by arrow a8. Then it flows into the left part of the second space 35 in the upper tank portion 18b.

The refrigerant moves from the left part of the second space 35 to the right part of the second space 35 as indicated by arrow a9.

The refrigerant at the right part of the second space 35 in the upper tank portion 18b moves down through the tubes 21 of the center right part of the heat exchange core portion 18a as indicated by arrow a10. Then it flows into the left part of the second space 35 in the lower tank portion 18c.

The refrigerant moves form the left part of the second space 35 to the right part of the second space 35 as indicated by arrow a11.

The refrigerant at the right part of the second space 35 in the lower tank portion 18c moves up through the tubes 21 of the right part of the heat exchange core portion 18a as indicated by arrow a12. Then it flows into the third space 36 in the upper tank portion 18b.

The refrigerant suction port 14b of the ejector 14 communicates with the third space 36 through the suction-side space 35b adapted as a fourth space. Therefore, the refrigerant in the third space 36 is sucked into the ejector 14 through the refrigerant suction port 14b as indicated by arrow a13.

Since the integrated unit 20 has the above-described refrigerant flow path configuration, only one refrigerant inlet 24 and one refrigerant outlet 25 can be provided in the entire integrated unit 20.

Description will be given to the operation of the first embodiment. When the compressor 11 is driven by a vehicle engine, the high-temperature, high-pressure refrigerant compressed at and discharged from the compressor 11 flows into the radiator 12. At the radiator 12, the high-temperature refrigerant is cooled by the outside air and condensed. The high-pressure refrigerant flowing out of the radiator 12 passes through the temperature expansion valve 13.

At the temperature expansion valve 13, the valve opening (refrigerant flow amount) is adjusted so that the degree of superheat of the outlet medium (compressor sucked refrigerant) of the first evaporator 15 becomes equal to a predetermined value and the high-pressure refrigerant is depressurized. The refrigerant (intermediate-pressure refrigerant) that having passed through the temperature expansion valve 13 flows into the one refrigerant inlet 24 provided in the integrated unit 20 and then flows into the flow amount divider 16.

At the flow amount divider 16, the refrigerant flow is branched into a main stream flowing into the nozzle portion 14a of the ejector 14 and a branch stream flowing into the throttling mechanism 17.

The refrigerant flowing into the nozzle portion 14a of the ejector 14 is depressurized and expanded at the nozzle portion 14a. Therefore, the pressure energy of the refrigerant is converted into speed energy at the nozzle portion 14a and the refrigerant is jetted from a jet port of the nozzle portion 14a at a high speed. The branch-stream refrigerant (gas-phase refrigerant) having passed through the second evaporator 18 is sucked through the refrigerant suction port 14b by reduction in refrigerant pressure due to the flow of the refrigerant jetted at high speed.

The refrigerant flowing out of the nozzle portion 14a and the refrigerant sucked through the refrigerant suction port 14b are mixed at the mixing portion 14c located downstream of the nozzle portion 14a and flow into the diffuser portion 14d. At the diffuser portion 14d, the speed (expansion) energy of the refrigerant is converted into pressure energy by increase in passage area; therefore, the pressure of the refrigerant is increased.

The refrigerant flowing out of the diffuser portion 14d of the ejector 14 flows through the flow path in the first evaporator 15 as indicated by arrows a2 to a4 in FIG. 2. During this time, at the heat exchange core portion 15a of the first evaporator 15, the low-temperature, low-pressure refrigerant absorbs heat from sent air in the direction of arrow F1 and is evaporated. After the evaporation, the gas-phase refrigerant is sucked into the compressor 11 through the one refrigerant outlet 25 and compressed again.

Meanwhile, the branched refrigerant flowing into the throttling mechanism 17 is depressurized and turned into low-pressure refrigerant (refrigerant in two phases of gas and liquid) at the throttling mechanism 17. This low-pressure refrigerant flows through the flow path in the second evaporator 18 as indicated by arrows a6 to a12 in FIG. 2. During this time, at the heat exchange core portion 18a of the second evaporator 18, the low-temperature and low-pressure refrigerant absorbs heat from sent air passing through the first evaporator 15, and is evaporated. After the evaporation, the gas-phase refrigerant is sucked into the ejector 14 through the refrigerant suction port 14b.

As described above, it is possible to supply the refrigerant located downstream of the diffuser portion 14d of the ejector 14 to the first evaporator 15 and supply the branch-stream refrigerant to the second evaporator 18 through the throttling mechanism 17. Therefore, cooling action can be simultaneously caused at the first and second evaporators 15, 18. For this reason, cool air cooled by both the first and second evaporators 15, 18 can be blown to the space to be cooled, thereby cooling the space.

At this time, the refrigerant evaporating pressure in the first evaporator 15 is the pressure obtained after pressurization at the diffuser portion 14d. Meanwhile, the outlet side of the second evaporator 18 is connected to the refrigerant suction port 14b of the ejector 14; therefore, the lowest pressure obtained immediately after depressurization at the nozzle portion 14a can be exerted on the second evaporator 18.

Thus, it is possible to make the refrigerant evaporating pressure (refrigerant evaporation temperature) in the second evaporator 18 lower than the refrigerant evaporating pressure (refrigerant evaporation temperature) in the first evaporator 15. As described above, the first evaporator 15 higher in refrigerant evaporation temperature is arranged on the upstream side in the air flow direction F1; and the second evaporator 18 lower in refrigerant evaporation temperature is arranged on the downstream side in the air flow direction F1. Thus, it is possible to ensure both the following differences: the difference between the refrigerant evaporation temperature and the temperature of sent air in the first evaporator 15; and the difference between the refrigerant evaporation temperature and the temperature of sent air in the second evaporator 18.

For this reason, it is possible to effectively exert both the cooling performance of the first evaporator 15 and that of the second evaporator 18. Therefore, the cooling performance for the common space to be cooled can be effectively improved by a combination of the first and second evaporators 15, 18. Further, the inlet pressure of the compressor 11 can be increased so as to reduce the driving power for the compressor 11 by pressurizing action at the diffuser portion 14d.

Figure 3:
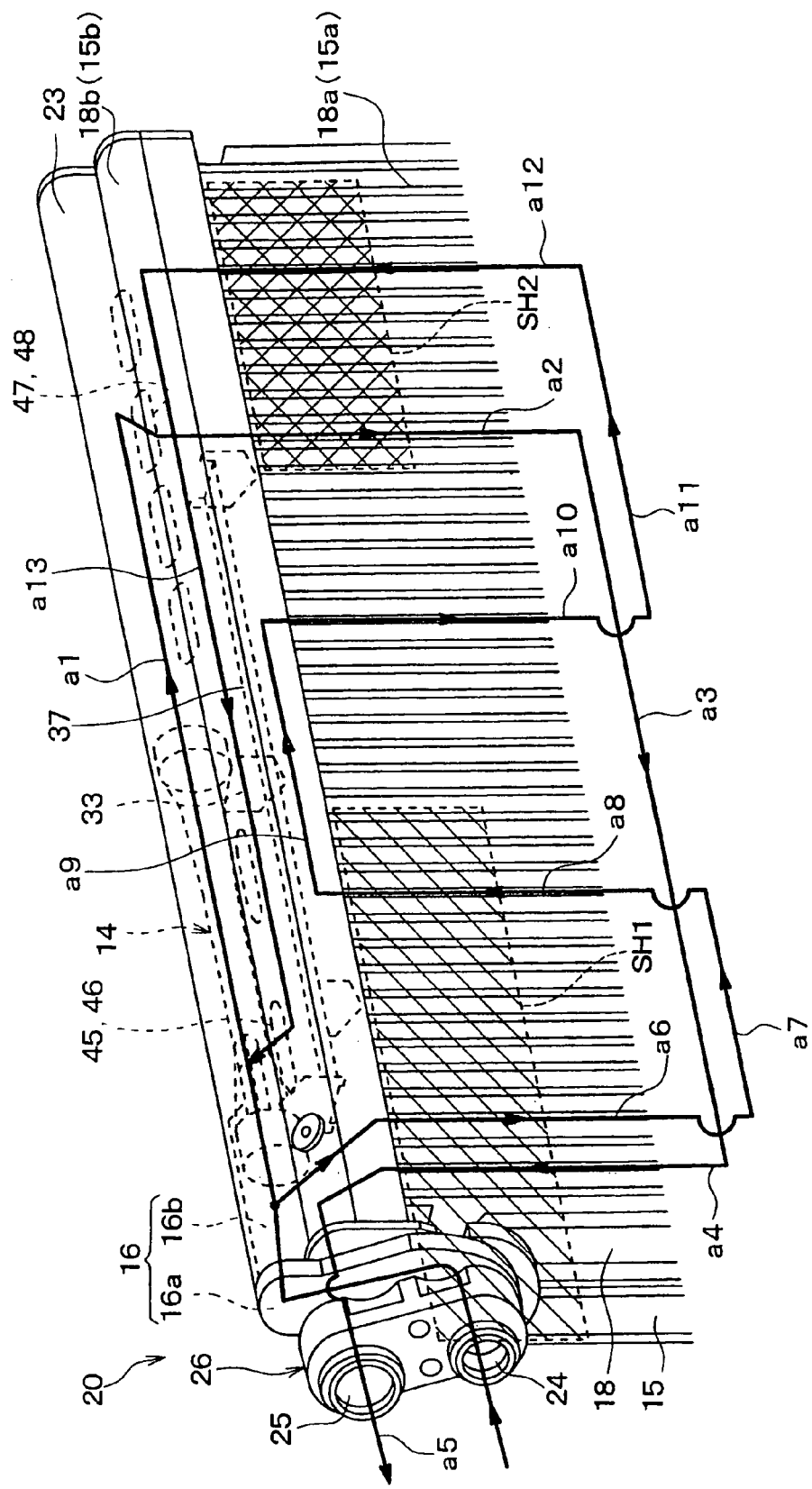
FIG. 3 is a perspective view illustrating the integrated unit in FIG. 2 as is partly enlarged.

According to the present embodiment, the refrigerant flow path is configured as illustrated in FIG. 2 and FIG. 3. As a result, the superheat area (area on the downstream side in the refrigerant flow) SH1 of the first evaporator 15 and the superheat area SH2 of the second evaporator 18 do not overlap with each other. For this reason, it is possible to suppress the production of temperature distribution in the air flow.

The entire first evaporator 15 arranged on the windward side is an outflow-side evaporator and the entire second evaporator 18 arranged on the leeward side is a suction-side evaporator. For this reason, it is possible to further suppress the production of temperature distribution in air blown out.

All the tubes 11 of the first evaporator 15 are outflow-side tubes; the entire upper tank portion 15b of the first evaporator 15 is an outflow-side tank portion; all the tubes 21 of the second evaporator 18 are suction-side tubes; and the entire upper tank portion 18b of the second evaporator 18 is a suction-side tank portion.

The refrigerant flow path for guiding the refrigerant flowing out of the ejector 14 to the first evaporator 15 is formed in the integrated unit 20 without use of a refrigerant pipe. Therefore, the integrated unit 20 can be reduced in size and pressure loss in refrigerant pressurized at the diffuser portion 14d can be suppressed. As a result, it is possible to sufficiently obtain the cycle efficiency (COP) enhancement effect by the ejector 14, that is, the COP enhancement effect by reducing the consumed power of the compressor 11.

In the present embodiment, especially, there are formed multiple communication holes 47, 48 forming the communication passages from the outlet of the ejector 14 to the upper tank portion 15b of the first evaporator 15. Thus, it is possible to further reduce pressure loss and to equally distribute refrigerant to the multiple tubes 21 of the first evaporator 15. The communication holes 47, 48 from the outlet of the ejector 14 to the upper tank portion 15b of the first evaporator 15 can also be adapted as a diffuser.

The refrigerant flowing into the nozzle portion 14a of the ejector 14 is refrigerant that is high in dryness, in gas and liquid two phases, separated by causing it to swirl and flow in the gas-liquid separation portion 16a. For this reason, the refrigerant flowing out of the outlet of the ejector 14 is also in a swirl flow.

In the present embodiment, as illustrated in FIG. 6C, the rib 47a protruding in the direction of tangent to the cylindrical surface of the housing tank portion 23 is formed at the opening edge portion of the communication hole 47 in the housing tank portion 23. Thus, it is possible to smoothly guide a swirl flow from the outlet of the ejector 14 to the upper tank portion 15b.

The rib 47a is protruded in the direction of assembly of the housing tank portion 23 to the upper tank portion 15b. This makes it easy to assemble the housing tank portion 23 to the upper tank portion 15b.

In the first and second evaporators 15, 18, the velocity of flow is increased to increase pressure loss as refrigerant is evaporated and its dryness is increased. In the present embodiment, the sectional areas are increased according to the velocity of refrigerant flow. Therefore, it is possible to suppress increase in pressure loss arising from increase in the velocity of refrigerant flow and thus improve performance.

Specifically, first, the sectional areas are so set that the following relation is satisfied:

$$Ai2 \leq Ai1 \leq Ao$$

where, Ao is the sectional area of the inner space in the upper tank portion 15b in the section vertical to the longitudinal direction; Ai1 is the sectional area of the suction-side passage 35b of the second space 35 in the upper tank portion 18b in the section vertical to the longitudinal direction; and Ai2 is the sectional area of the first space 34 in the upper tank portion 18b in the section vertical to the longitudinal direction.

Second, the numbers of tubes are so set that the following relation is satisfied:

$$No1 \leq No2$$

where, No1 is the tube number in the tube group (the other end-side outflow-side tubes) connected to the second space 32 in the upper tank portion 15b; and No2 is the tube number in the tube group (one end-side outflow-side tubes) connected to the first space 31 in the upper tank portion 15b.

Third, the numbers of tubes are so set that the following relation is satisfied:

$$Ni1 \leq Ni2 \leq Ni3 \leq Ni4$$

where, Ni1 is the tube number in the tube group (one end-side suction-side tubes) connected to the third space 36 in the upper tank portion 18b; Ni2 is the tube number in the tube group connected to the first space 34 in the upper tank portion 18b and the first space 38 in the lower tank portion 18c; Ni3 is the tube number in the tube group connected to the first space 34 in the upper tank portion 18b and the second space 39 in the lower tank portion 18c; and Ni4 is the tube number in the tube group (the other end-side suction-side tubes) connected to the second space 35 in the upper tank portion 18b.

According to the present embodiment, the refrigerant separated into gas and liquid at the gas-liquid separation portion 16a formed in the joint 26 is divided into the side of the nozzle portion 14a of the ejector 14 and the side of the throttling mechanism 17 and the second evaporator 18. Therefore, the efficiency (COP) of a refrigeration cycle can be enhanced as with the above-described conventional technology.

According to the present embodiment, the ejector 14, refrigerant dividing portion 16b, and joint 26 are arranged in line in the longitudinal direction of the ejector 14. Therefore, increase in the physical size of the unit can be suppressed even when the gas-liquid separation portion 16a and the refrigerant dividing portion 16b are integrated as an evaporator unit together with the ejector 14 and the first and second evaporators 15, 18 so as to enhance the incorporability of an ejector refrigeration cycle.

In the present embodiment, the long and thin hole 263d (introduction passage 263d) is connected to the outermost circumferential portion of the columnar space 263c in the gas-liquid separation portion 16a in the tangential direction. Further, the gas-liquid separation portion 16a is formed of a laminated structure of the plate members 262 to 265. Therefore, even when the refrigerant flow amount is low, a swirl flow can be stably produced at the gas-liquid separation portion 16a, and thereby the gas-liquid separation can be stably carried out at the gas-liquid separation portion 16a.

Figure 9A:
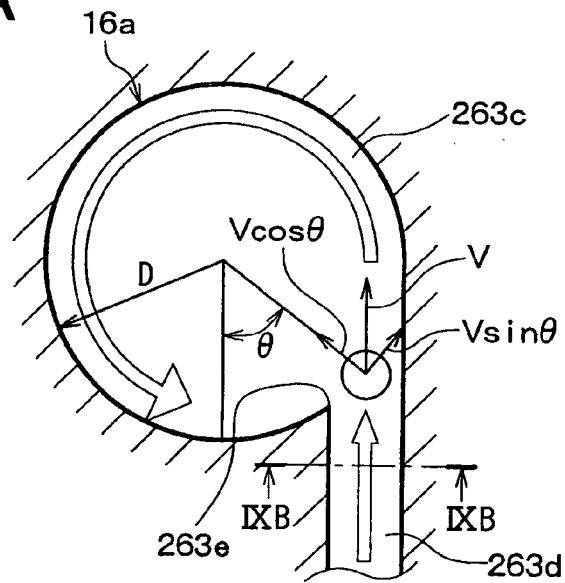
FIG. 9A is a schematic sectional view explaining a swirl ratio of a gas-liquid separation portion.
Figure 9B:
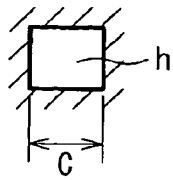
FIG. 9B is another schematic sectional view explaining the swirl ratio of the gas-liquid separation portion.

Detailed description will be given to this effect. FIG. 9A is a drawing explaining swirl ratio, which is a dimensionless number indicating the swirl strength in the gas-liquid separation portion 16a. FIG. 9B is a sectional view taken along line IXB-IXB of FIG. 9A. The swirl ratio S is in proportion to the ratio of the amount of rotational motion to the amount of inflow motion (the amount of rotational motion/the amount of inflow motion) and is expressed by $S=(D/h)\cdot\tan\theta$, where, D is the swirl diameter (the radius of the columnar space 263c) of the gas-liquid separation portion 16a; h is the sectional area of the introduction passage 263d; and $\theta$ is the inflow angle of refrigerant. In FIG. 9A, symbol V denotes the inflow velocity of refrigerant and symbol C denotes the width of the introduction passage 263d.

The swirl ratio S is increased as the inflow angle $\theta$ and the swirl diameter D are increased. As a result, the amount of motion of introduced refrigerant is efficiently converted into the amount of rotational motion.

Figure 10A:
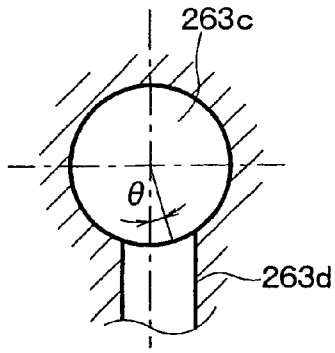
FIG. 10A is an explanatory drawing explaining an eccentric angle of a gas-liquid separation portion.
Figure 10B:
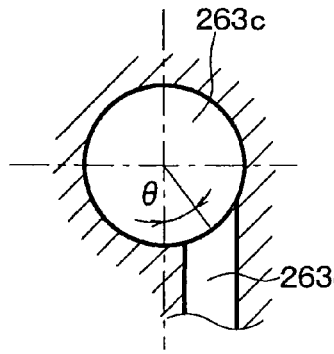
FIG. 10B is another drawing explaining the eccentric angle of the gas-liquid separation portion.
Figure 10C:
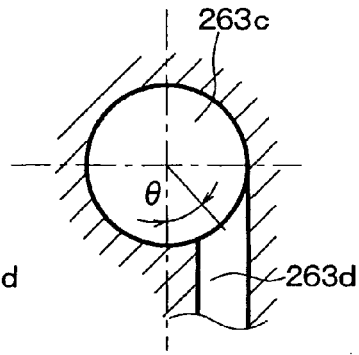
FIG. 10C is further another drawing explaining the eccentric angle of the gas-liquid separation portion.

FIGS. 10A to 10C show the relation between the position of connection of the introduction passage 263d to the columnar space 263c and the inflow angle (angle of eccentricity) $\theta$. As illustrated in FIG. 10C, the inflow angle (angle of eccentricity) $\theta$ is maximized when the introduction passage 263d is connected to the outermost circumferential portion of the columnar space 263c in the tangential direction.

Figure 11A:
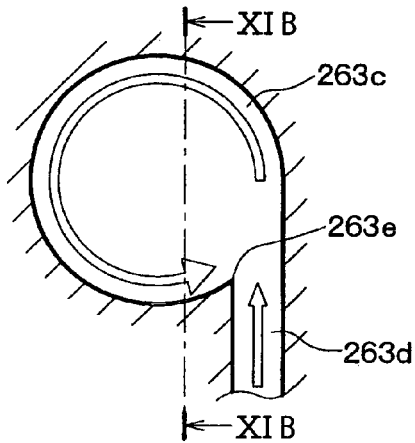
FIG. 11A is a sectional view illustrating gas-liquid separation portions in the first embodiment.
Figure 11C:
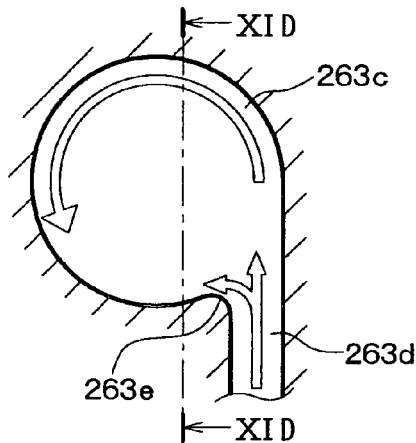
FIG. 11C is a sectional view illustrating the gas-liquid separation portions in a comparative example.
Figure 11B:
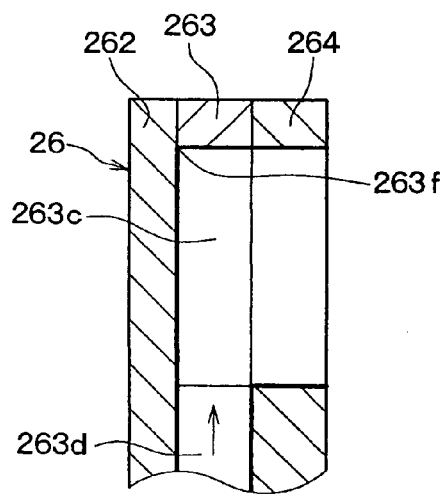
FIG. 11B is another sectional view illustrating the gas-liquid separation portions in the first embodiment.
Figure 11D:
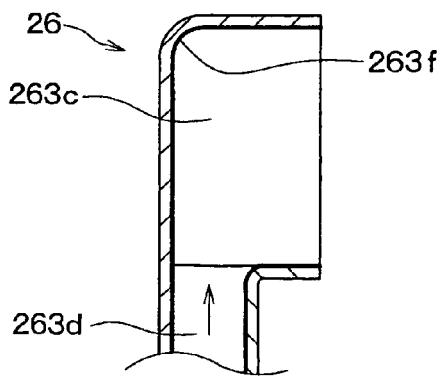
FIG. 11D is another sectional view illustrating the gas-liquid separation portions in the comparative example.

As illustrated in FIGS. 11A and 11B, the swirl diameter D can be increased by forming the gas-liquid separation portion 16a of a laminated structure of the plate members 262 to 265. FIGS. 11C and 11D illustrate a comparative example in which the gas-liquid separation portion 16a is drawn by press.

In the comparative example in which the gas-liquid separation portion 16a is drawn by press, it is difficult to avoid rounding of the corner 263f between the cylindrical surface and the end face forming the columnar space 263c as illustrated in FIG. 11D. In the comparative example, for this reason, the swirl diameter D is reduced by the corner 263f.

Meanwhile, in the present embodiment in which the gas-liquid separation portion 16a is formed of a laminated structure of the plate members 262 to 265, the columnar space 263c can be formed without rounding the corner 263f as illustrated in FIG. 11B. This makes it possible to avoid reduction of the swirl diameter D by the corner 263f.

In the comparative example in which the gas-liquid separation portion 16a is drawn by press, it is difficult to avoid the corner 263e between the introduction passage 263d and the columnar space 263c from also be rounded as illustrated in FIG. 11C. In the comparative example, for this reason, the refrigerant in the introduction passage 263d flows in at the corner 263e in the opposite direction to the direction of swirl in the columnar space 263c. As a result, the amount of motion of the introduced refrigerant is not efficiently converted into the amount of rotational motion.

In the present embodiment in which the gas-liquid separation portion 16a is formed of a laminated structure of the plate members 262 to 265, the circular hole 263c and the long and thin hole 263d (as introduction passage 263d) are punched in the flow-path formation plate member 263 during press molding. This makes it possible to form the acute-angled corner 263e in a sharp shape with a very small curvature radius as illustrated in FIG. 11A and to form the introduction passage 263d and the columnar space 263c.

For this reason, it is possible to cause refrigerant in the introduction passage 263d to flow in along the direction of swirl in the columnar space 263c and thus efficiently convert the amount of motion of the introduced refrigerant into the amount of rotational motion.

Figure 12:
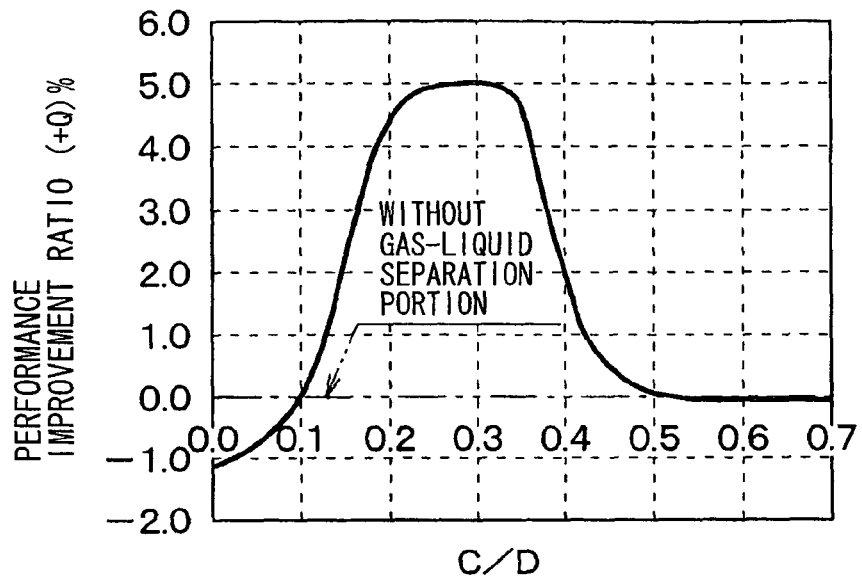
FIG. 12 is a graph indicating the relation between the C/D and performance improvement ratio of a gas-liquid separation portion.

Incidentally, the performance improvement effect by the gas-liquid separation portion 16a can be obtained by taking the following measure: the width C of the introduction passage 263d is set to a value not less than 10% of and not more than 50% of the radius D of the columnar space 263c ($0.1 \leq C/D \leq 0.5$). The performance improvement ratio indicated on the vertical axis in FIG. 12 is a performance ratio in a unit, as compared with an integrated unit without the gas-liquid separation portion 16a.

The performance improvement effect by the gas-liquid separation portion 16a is increased by setting the width C of the introduction passage 263d to a value not less than 15% of and not more than 40% of the radius D of the columnar space 263c ($0.15 \leq C/D \leq 0.4$).

The performance improvement effect by the gas-liquid separation portion 16a is further increased by setting the width C of the introduction passage 263d to a value not less than 20% of and not more than 35% of the radius D of the columnar space 263c ($0.2 \leq C/D \leq 0.35$). Therefore, this setting is favorable.

Figure 13:
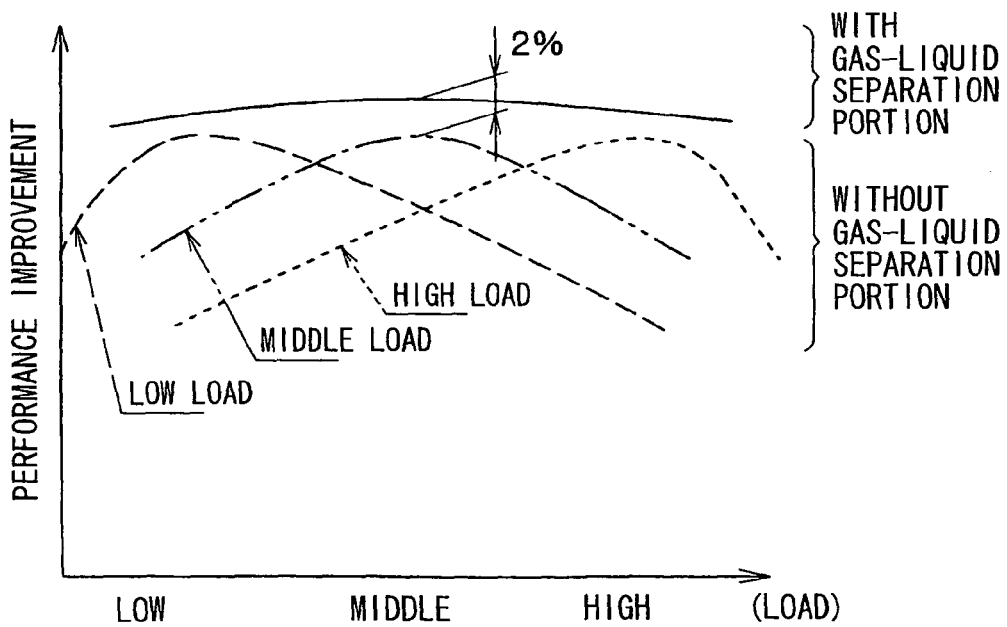
FIG. 13 is a graph indicating the performance improvement effect in the first embodiment.
Figure 14A:
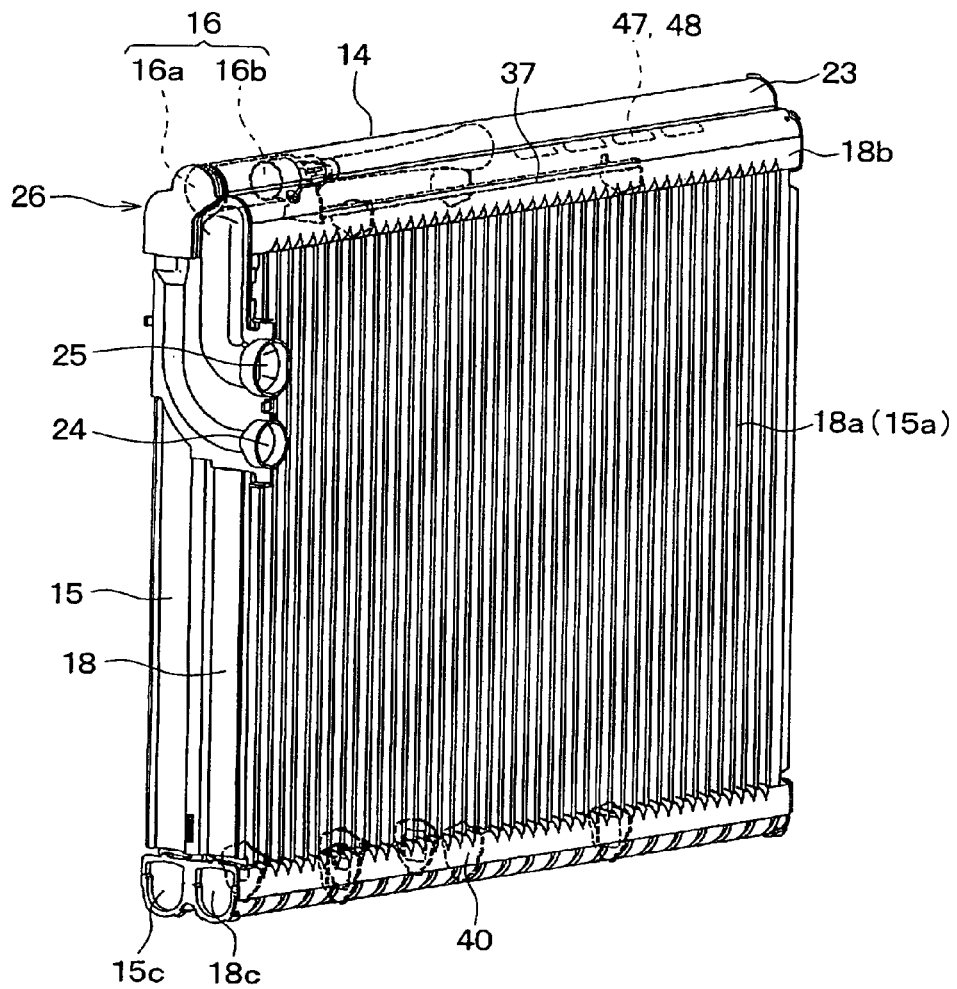
FIG. 14A is a perspective view of an integrated unit in a first modification of the first embodiment.
Figure 14B:
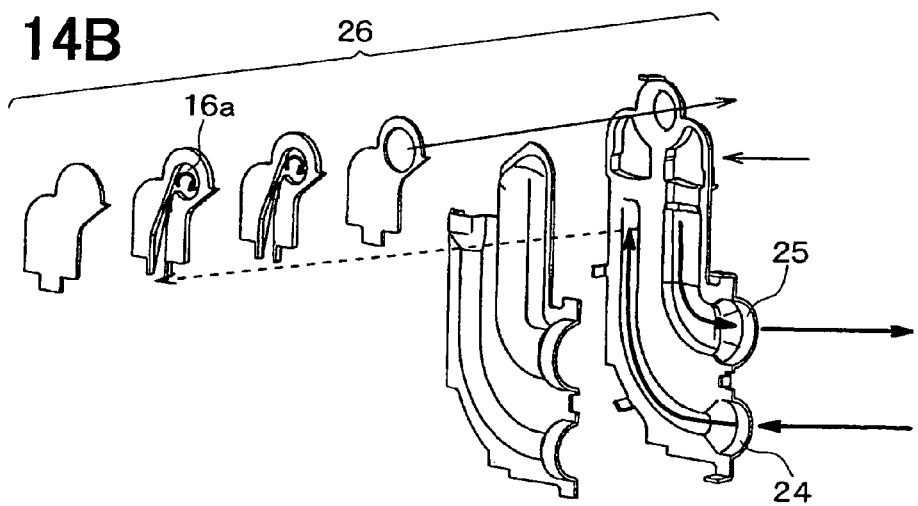
FIG. 14B is an exploded perspective view illustrating the joint of the integrated unit in FIG. 14A.

In the present embodiment, as mentioned above, it is possible to stably produce a swirl flow in the gas-liquid separation portion 16a and stably carry out gas-liquid separation even when the refrigerant flow amount is low. Therefore, the performance improvement effect by the gas-liquid separation portion 16a can be obtained over the entire range from a range where the air conditioning load is low to a range where the air conditioning load is high as shown in FIG. 13.

This embodiment in which the gas-liquid separation portion 16a is formed of a laminated structure of the plate members 262 to 265 brings about the following advantages as compared with the comparative example in which the gas-liquid separation portion 16a is drawn by pressing.

(1) In the comparative example in which the gas-liquid separation portion 16a is drawn by pressing, the plate thickness of plate bending portions is reduced. In the present embodiment, meanwhile, reduction in plate thickness is smaller than in the comparative example.

(2) In the comparative example in which the gas-liquid separation portion 16a is drawn by pressing, limitations, such as reduction in brazing margin and reduction in flow path, are produced by the roundness (R) produced in plate bending areas. In the present embodiment, meanwhile, such limitations (reduction in brazing margin and reduction in flow path) as in the comparative example are not produced.

According to the embodiment, a refrigerant flow path as illustrated in FIG. 2 and FIG. 3 is configured. Therefore, the superheat area (downstream area in the refrigerant flow) SH1 of the first evaporator 15 and the superheat area SH2 of the second evaporator 18 do not overlap with each other. For this reason, the production of temperature distribution in air blown out can be suppressed.

The entire first evaporator 15 arranged on the windward side is an outflow-side evaporator and the entire second evaporator 18 arranged on the leeward side is a suction-side evaporator 18. For this reason, the production of temperature distribution in air blown out in the integrated unit can be further suppressed.

Incidentally, all the tubes 21 of the first evaporator 15 are outflow-side tubes; the entire upper tank portion 15b of the first evaporator 15 is an outflow-side tank portion; all the tubes 21 of the second evaporator 18 are suction-side tubes; and the entire upper tank portion 18b of the second evaporator 18 is a suction-side tank portion.

According to the present embodiment, the refrigerant flow path for guiding refrigerant flowing out of the ejector 14 to the first evaporator 15 (outflow-side evaporator) is formed in the integrated unit 20 without use of a refrigerant pipe. Thus, it is possible to reduce the size of the integrated unit 20 and further suppress pressure loss in refrigerant pressurized at the diffuser portion 14d. As a result, it is possible to sufficiently obtain the cycle efficiency (COP) enhancement effect by the ejector 14, that is, the COP enhancement effect by reducing the consumed power of the compressor.

In the present embodiment, especially, there are formed multiple communication holes 47, 48 comprising the communication passages from the outlet of the ejector 14 to the upper tank portion 15b of the first evaporator 15. This makes it possible to further reduce pressure loss and equally distribute refrigerant to the multiple tubes 21 of the first evaporator 15. The communication holes 47, 48 from the outlet of the ejector 14 to the upper tank portion 15b of the ejector 15 can also be caused to function as a diffuser.

The refrigerant flowing into the nozzle portion 14a of the ejector 14 is refrigerant, which is high in dryness and is separated by causing it to swirl and flow in the gas-liquid separation portion 16a. For this reason, the refrigerant flowing out of the outlet of the ejector 14 is also in a swirl flow.

In the present embodiment, as illustrated in FIG. 6C, the rib 47a protruded in the direction of tangent to the cylindrical surface of the housing tank portion 23 is formed at the opening edge portion of the communication hole 47 in the housing tank portion 23. This makes it possible to smoothly guide a swirl flow from the outlet of the ejector 14 to the upper tank portion 15b.

The rib 47a is protruded in the direction of assembly of the housing tank portion 23 to the upper tank portion 15b. This makes it easy to assemble the housing tank portion 23 to the upper tank portion 15b.

FIGS. 14A and 14B and FIGS. 15A and 15B respectively illustrate first and second modifications to the present embodiment. In the first modification in FIGS. 14A and 14B, the refrigerant inlet 24 and the refrigerant outlet 25 in the joint 26 are open toward the downstream side in the air flow direction F1. The joint 26 can be formed of a laminated structure of plate members.

Figure 15A:
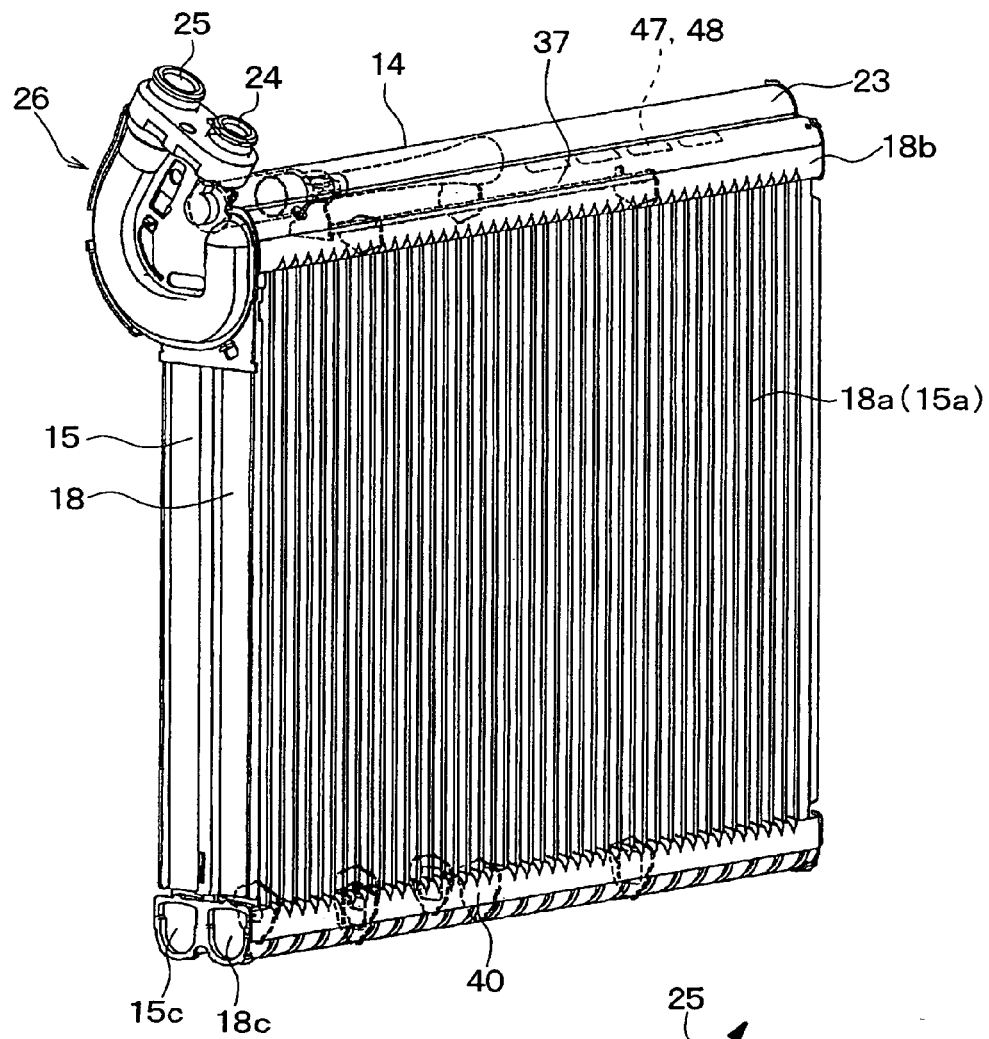
FIG. 15A is a perspective view of an integrated unit in a second modification of the first embodiment.
Figure 15B:
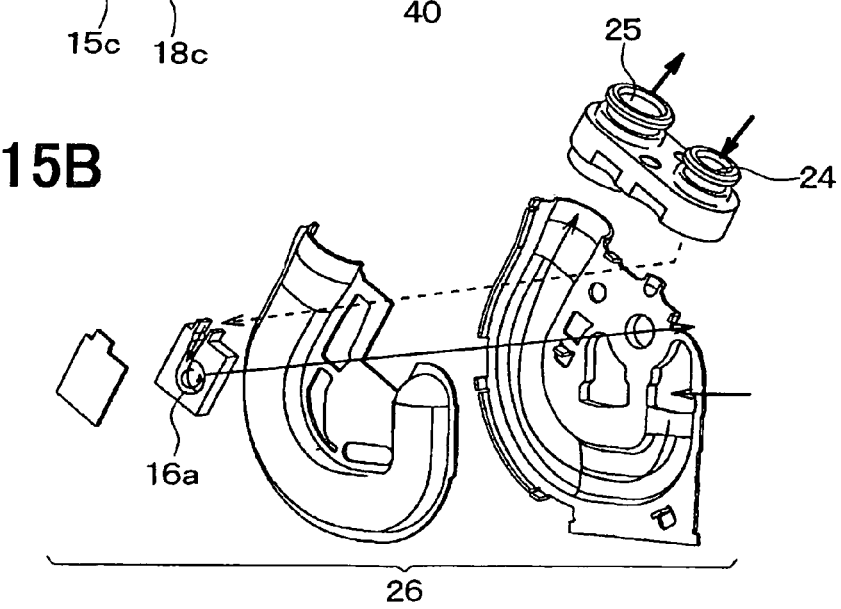
FIG. 15B is an exploded perspective view illustrating the joint of the integrated unit in FIG. 15A.

In the second modification in FIGS. 15A and 15B, the refrigerant inlet 24 and the refrigerant outlet 25 in the joint 26 are open upward (one end side of the tubes 21 in the longitudinal direction). This joint 26 can be formed of a block member with the refrigerant inlet 24 and the refrigerant outlet 25 formed therein and multiple plate members.

Figure 16:
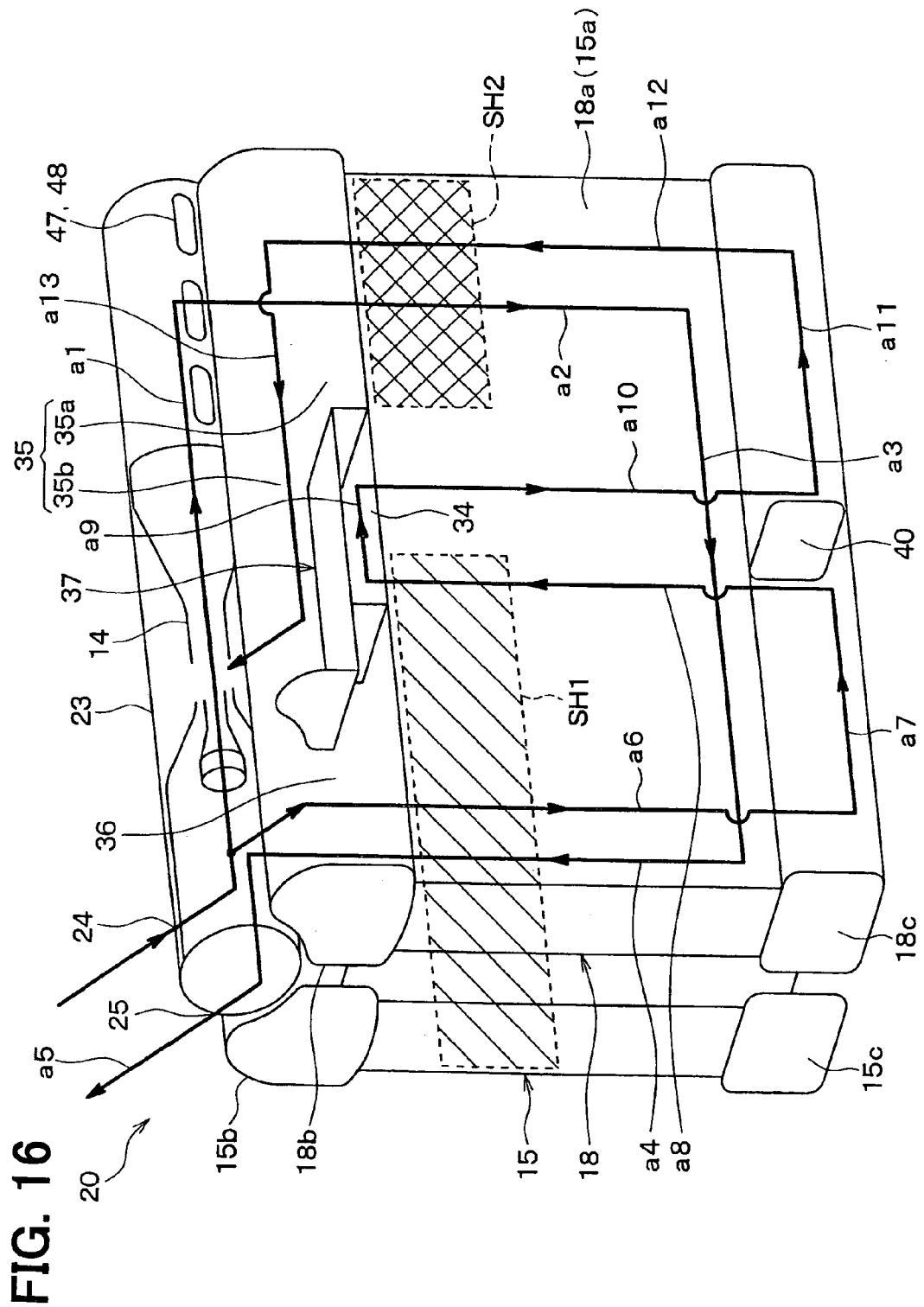
FIG. 16 is a perspective view of an integrated unit in a third modification of the first embodiment.

FIG. 16 illustrates a third modification to the present embodiment. In this modification, the refrigerant inlet 24 and the refrigerant outlet 25 of the integrated unit 20 are so provided that they face toward the upstream side in the air flow direction F1. Specifically, the refrigerant inlet 24 is provided in the cylindrical surface of the housing tank portion 23 and the refrigerant outlet 25 is provided in the upper tank portion 15b. Also in the third modification, the same action and effect as mentioned above can be obtained.

Figure 17:
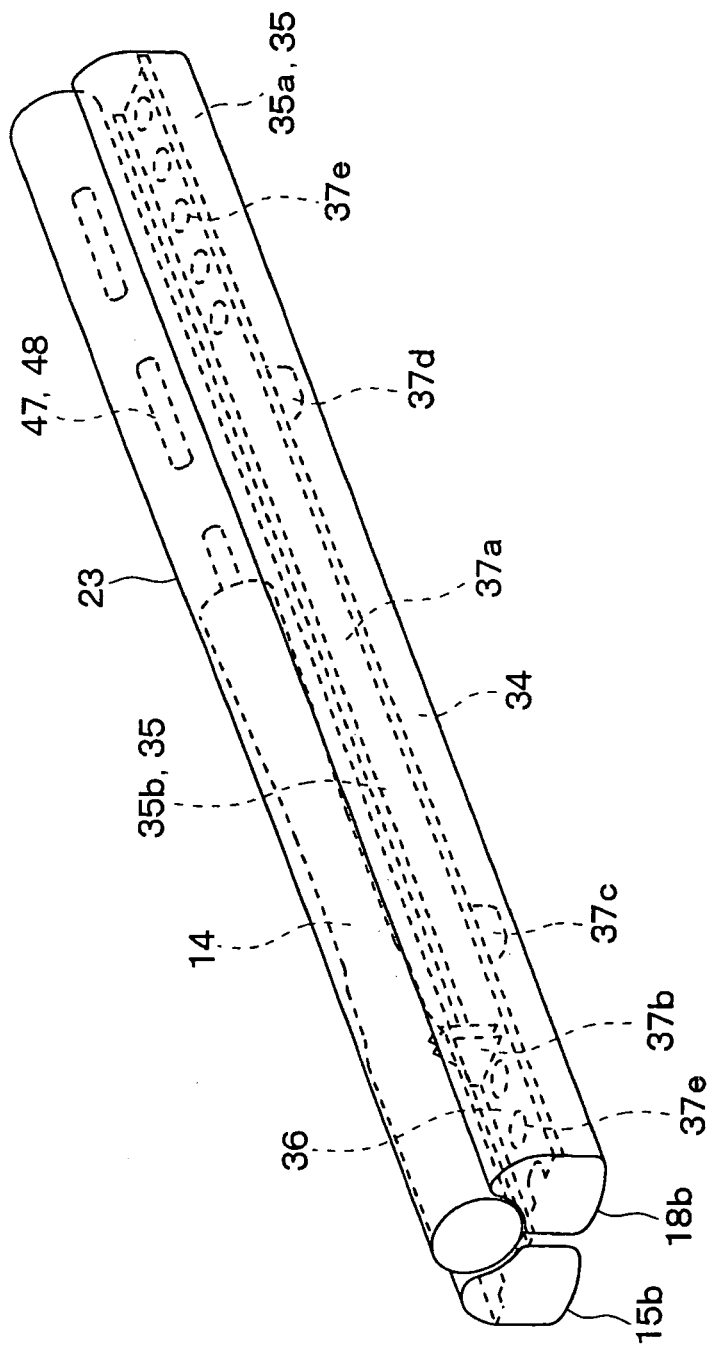
FIG. 17 is a perspective view of an upper tank portion in a fourth modification of the first embodiment.

FIG. 17 illustrates a fourth modification to the present embodiment. In this modification, the partitioning plate 37a of the partitioning portion 37 is disposed throughout the inner space in the upper tank portion 18b of the second evaporator 18. A through hole 37e is formed at the parts of the partitioning plate 37a other than the part dividing the first space 34 of the upper tank portion 18b and the suction-side passage 35b of the second space 35 from each other. Also in the fourth modification, the inner space in the upper tank portion 18b can be divided into the first to fourth spaces 34 to 37.

The partitioning plate 37a is also placed throughout the inner space in the upper tank portion 15b of the first evaporator 15 after through holes are formed therein.

FIGS. 18A to 18E illustrate fifth to ninth modifications to the present embodiment. The fifth to ninth modifications relate to the concrete formation structure of the housing tank portion 23 and the upper tank portions 15b, 18b.

Figure 18A:
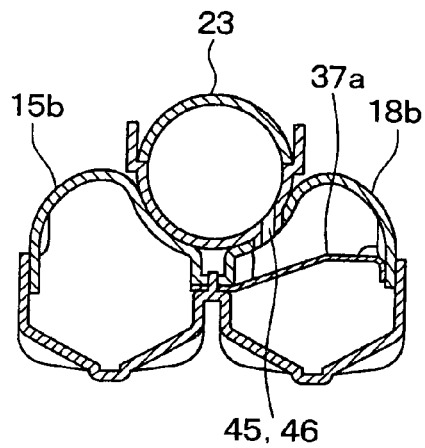
FIG. 18A is a sectional view of an upper tank portion in a fifth modification of the first embodiment.

In the fifth modification in FIG. 18A, the partitioning plate 37a of the partitioning portion 37 is inclined so that it descends as it goes toward the upper tank portion 15b (left side in FIG. 18A).

Figure 18D:
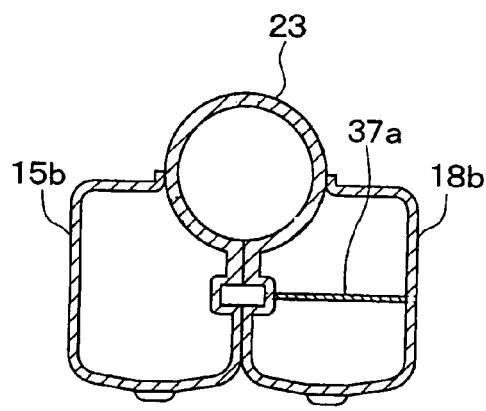
FIG. 18D is a sectional view of an upper tank portion in an eighth modification of the first embodiment.
Figure 18B:
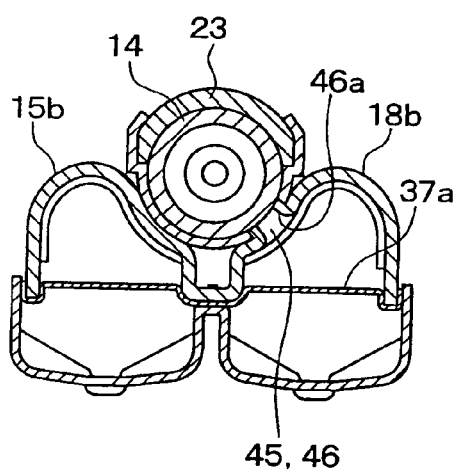
FIG. 18B is a sectional view of an upper tank portion in a sixth modification of the first embodiment.

In the sixth modification in FIG. 18B, a rib 46a is formed at the opening edge portion of the communication hole 46 in the upper tank portion 18b by burring. The direction of protrusion of the rib 46a is set to a direction oblique to the direction of tangent to the cylindrical surface of the housing tank portion 23.

Figure 18E:
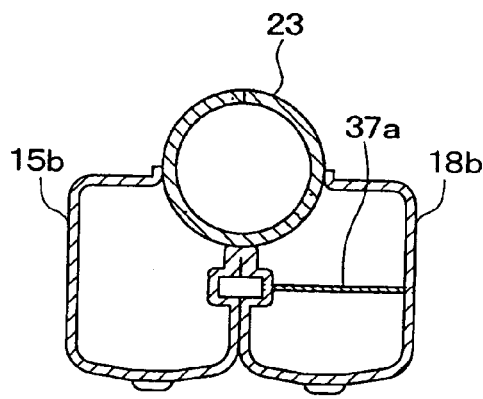
FIG. 18E is a sectional view of an upper tank portion in a ninth modification of the first embodiment.
Figure 18C:
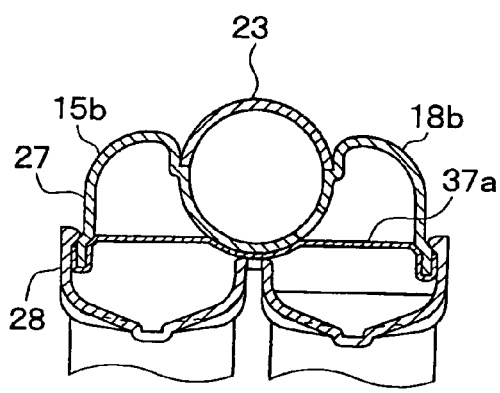
FIG. 18C is a sectional view of an upper tank portion in a seventh modification of the first embodiment.

In the seventh modification in FIG. 18C, the lower half cylindrical portion of the housing tank portion 23 is formed integrally with the upper member 27 of the upper tank portions 15b, 18b.

In the eighth modification in FIG. 18D, the entire housing tank portion 23 is formed integrally with the upper tank portions 15b, 18b. Specifically, a strip material is bent to form the cross-sectional shape of the housing tank portion 23 and the upper tank portions 15b, 18b and then butted portions are brazed together.

In the ninth modification in FIG. 18E, the housing tank portion 23 and the upper tank portions 15b, 18b are separately formed and the housing tank portion 23 and the upper tank portions 15b, 18b are each integrally formed as a single part.

Specifically, with respect to the housing tank portion 23, a strip material is cylindrically bent and then butted portions are brazed together. With respect to the upper tank portions 15b, 18b, a strip material is bent to form the cross-sectional shape of the upper tank portions 15b, 18b and then butted portions are brazed together.

(Second Embodiment)

FIG. 19A illustrates an integrated unit 120 in a second embodiment and FIG. 19B illustrates a joint 26 in FIG. 19A. In the second embodiment, as illustrated in FIG. 19A, the first and second evaporators 15, 18 are configured as a so-called laminated heat exchanger. More specific description will be given. The first and second evaporators 15, 18 include tube plates 60 that are so configured that tubes 21 are formed by joining a pair of plates 60 together and they are formed by laminating multiple tube plates 60.

Specifically, multiple flat tubes 21 are laminated and formed by laminating aluminum plates press-formed in a predetermined shape and joining them together by brazing. Then the tank portions 15b, 15c, 18b, 18c are formed at both ends of the tubes 21 in the longitudinal direction.

In each tube plate 60, there are appropriately formed shapes for forming the same refrigerant flow path a1 to a13 as in the first embodiment. Specifically, there are formed a hole shape for housing the ejector 14, a partitioning shape for partitioning the inner spaces in the tank portions 15b, 18b, 18c, and the like.

In the present embodiment, the other parts may be the same as in the first embodiment. Also in the present embodiment, the same refrigerant flow path a1 to a13 as in the first embodiment is configured; therefore, the same action and effect as in the first embodiment can be obtained.

(Third Embodiment)

In the above description of the first and second embodiments, an evaporator unit 20 used in an ejector refrigeration cycle 10 has been taken as an example. In the description of the third embodiment, an evaporator unit 120 used in an expansion valve cycle 100 not provided with an ejector 14 will be taken as an example.

Figure 20:
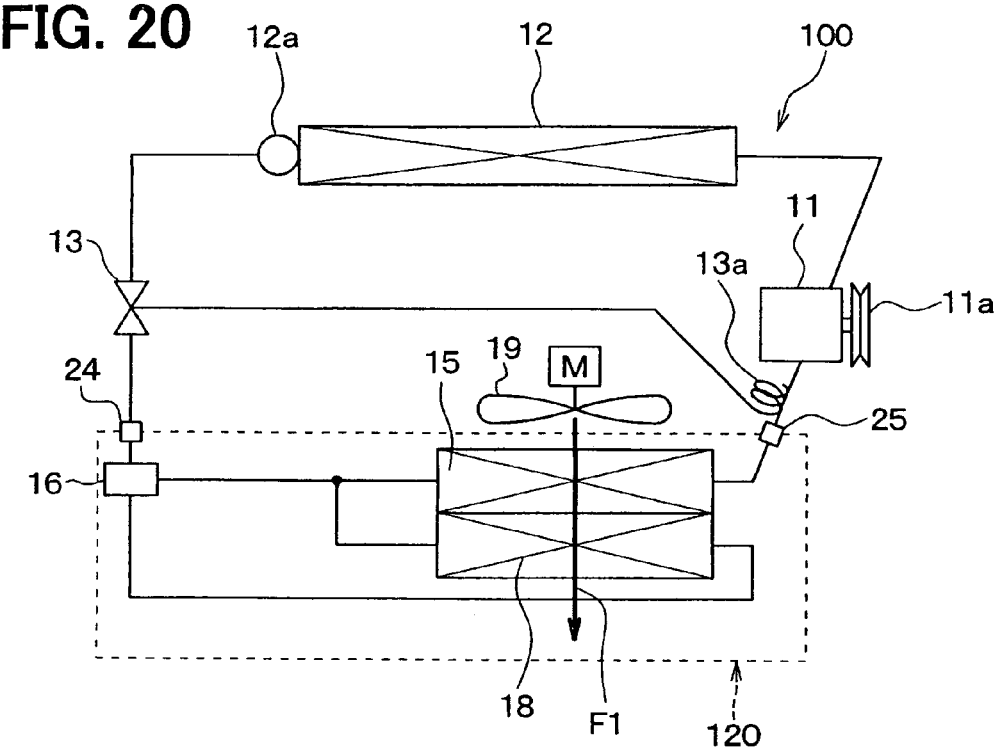
FIG. 20 is an overall schematic diagram of a refrigeration cycle in a third embodiment.

As illustrated in FIG. 20, the expansion valve cycle 100 is provided on the outlet side of the radiator 12 with a liquid receiver 12a. The liquid receiver 12a is formed into a vertically long tank portion shape and includes a gas-liquid separator that separates refrigerant into gas and liquid and stores surplus liquid refrigerant in the cycle. Liquid refrigerant is guided from the lower part side of the interior of the tank portion shape to the outlet of the liquid receiver 12a. In this example, the liquid receiver 12a is provided integrally with the radiator 12.

A generally known configuration may be adopted as the radiator 12 to include a heat exchange portion for condensation positioned on the upstream side in the refrigerant flow, the liquid receiver 12a into which refrigerant from the heat exchange portion for condensation is guided and which separates the refrigerant into gas and liquid; and a heat exchanger portion for supercooling that supercools saturated liquid refrigerant from the liquid receiver 12a.

The temperature expansion valve 13 is disposed on the outlet side of the liquid receiver 12a. The flow amount divider 16 placed on the refrigerant outlet side of the temperature expansion valve 13 divides the refrigerant having passed through the temperature expansion valve 13 into the first evaporator 15 side and the second evaporator 18 side. The outlet side of the second evaporator 18 is connected to a position between the flow amount divider 16 and the first evaporator 15.

In the present embodiment, the first and second evaporators 15, 18 and the flow amount divider 16 are assembled as one integrated unit 120. Description will be given to a concrete example of the integrated unit 120.

Figure 21:
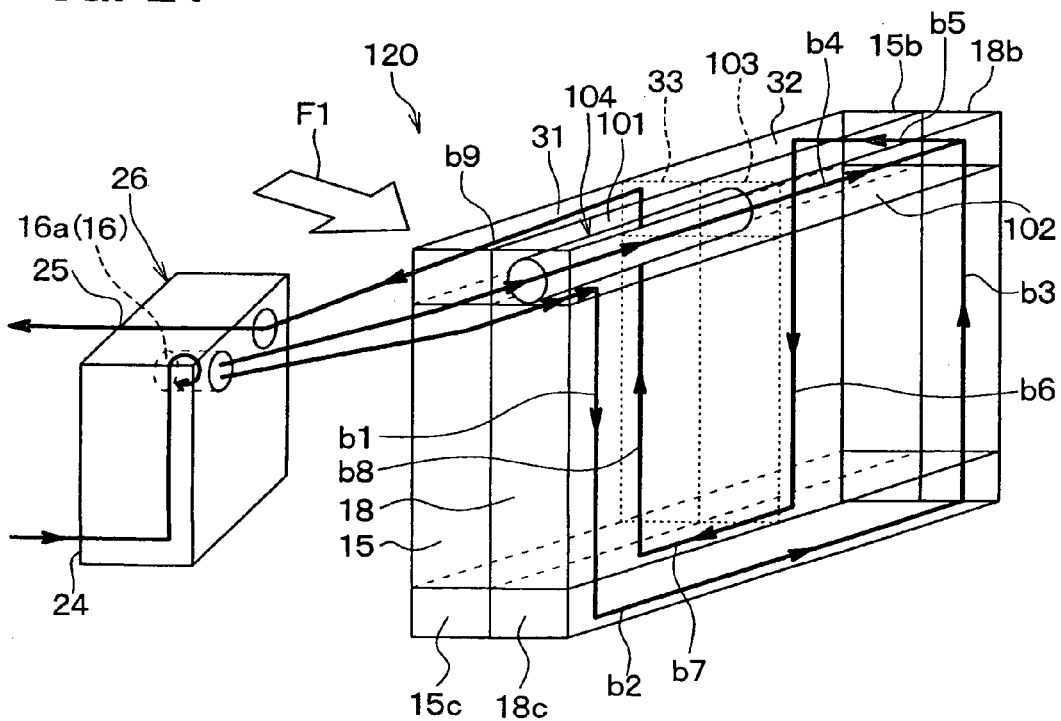
FIG. 21 is a schematic perspective view of an integrated unit in the third embodiment.
Figure 22:
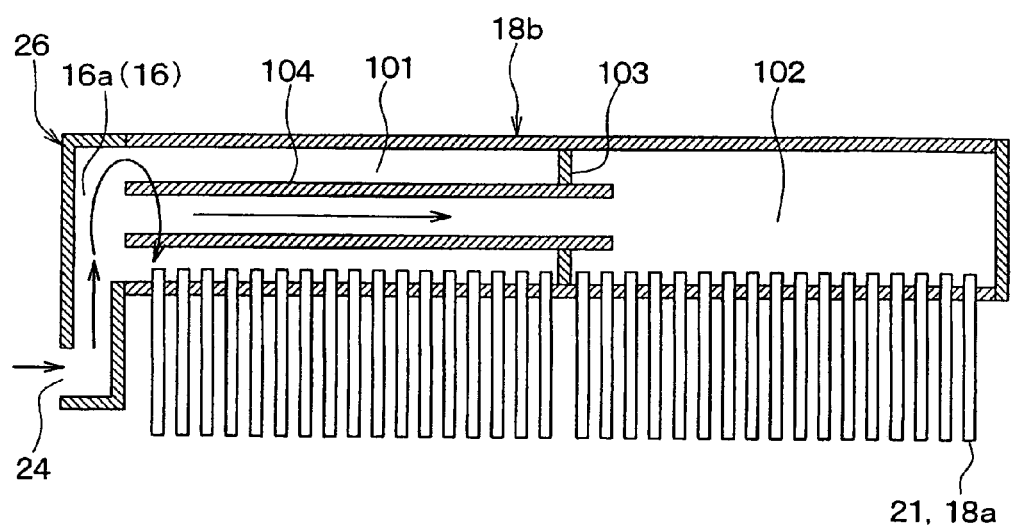
FIG. 22 is a sectional view of an upper tank portion in the third embodiment.

FIG. 21 is a perspective view schematically illustrating the overall configuration of the integrated unit 120, and FIG. 22 is a schematic sectional view of the upper tank portion 18b of the integrated unit 120. The refrigerant inlet 24 and the refrigerant outlet 25 of the integrated unit 120 are formed in the joint 26 fixed on the side surface portions of the upper tanks 15b, 18b by brazing.

The refrigerant inlet 24 in the joint 26 communicates with one end of the inner space in the upper tank portion 18b in the longitudinal direction, and the refrigerant outlet 25 in the joint 26 communicates with one end of the inner space in the upper tank portion 15b in the longitudinal direction.

The inner space in the upper tank portion 15b of the first evaporator 15 is partitioned into the first space 31 located on one side in the longitudinal direction and the second space 32 located on the other side in the longitudinal direction by the partitioning plate 33.

In the upper tank portion 18b of the second evaporator 18, a partitioning plate 103 is fixed by brazing. The partitioning plate 103 partitions the inner space in the upper tank portion 18b into a first space 101 located on one side in the tank longitudinal direction and a second space 102 located on the other side in the tank longitudinal direction.

Meanwhile, in the lower tank portions 15c, 18c of the first and second evaporators 15, 18, no partitioning plate is provided.

In the first space 101 of the upper tank portion 18b, there is disposed an introduction pipe 104 extended in parallel with the longitudinal direction. As illustrated in FIG. 22, one end (end portion on the joint 26 side) of the introduction pipe 104 is open toward the gas-liquid separation portion 16a in the joint 26. The other end (end portion on the opposite side to the joint 26) of the introduction pipe 104 is inserted into a through hole formed in the partitioning plate 103 and fixed there by brazing. Though not shown in the drawing, the other end portion of the introduction pipe 104 is protruded from the through hole in the partitioning plate 103 into the second space 102 in the upper tank portion 18b and communicates with the second space 102.

The second space 102 in the upper tank portion 18b communicates with the first space 32 in the upper tank portion 15b through a communication hole (not shown). The communication hole may be plurally formed along the longitudinal direction of the tank portions or may be singly formed in such a shape that it is elongated along the longitudinal direction of the tank portions.

Specific description will be given to the refrigerant flow path in the entire integrated unit 120 configured as mentioned above with reference to FIG. 21. First, the refrigerant that flowed in through the refrigerant inlet 24 in the joint 26 swirls and flows along the cylindrical surface of the gas-liquid separation portion 16a and the refrigerant is separated into gas and liquid by the centrifugal force of the swirl flow.

Of the flow of refrigerant separated into gas and liquid at the gas-liquid separation portion 16a, the flow of refrigerant in two phases, gas and liquid, going through the center of the gas-liquid separation portion 16a enters the introduction pipe 104 in the upper tank portion 18b. The flow of liquid-phase refrigerant going through the peripheral portion of the gas-liquid separation portion 16a enters the first space 101 in the upper tank portion 18b.

The liquid-phase refrigerant that flowed into the first space 101 moves down through the multiple tubes 21 at the left part of the second evaporator 18 positioned on the leeward side as indicated by arrow b1. Then it flows into the left part of the lower tank portion 18c. This lower tank portion 18c is not provided therein with a partitioning plate. Therefore, the refrigerant moves from the left part to the right part of the lower tank portion 18c as indicated by arrow b2.

The refrigerant at the right part of the lower tank portion 18c moves up through the multiple tubes 21 at the right part of the second evaporator 18 as indicated by arrow b3 and flows into the second space 102 in the upper tank portion 18b.

Meanwhile, the refrigerant in two phase, gas and liquid, that flowed into the introduction pipe 104 passes through the introduction pipe 104 and flows into the second space 102 in the upper tank portion 18b as indicated by arrow b4.

The refrigerant (arrow b3) that passed through the second evaporator 18 and the refrigerant (arrow b4) that passed through the introduction pipe 104 join together in the second space 102. Then the refrigerant goes through the communication hole, not shown, and flows into the second space 32 in the upper tank portion 15b as indicated by arrow b5.

The refrigerant in the second space 32 is distributed to the multiple tubes 21 at the right part of the first evaporator 15 positioned on the windward side. Then it moves down through the tubes 21 as indicated by arrow b6 and flows into the right part of the lower tank portion 15c. The lower tank portion 15c is not provided therein with a partitioning plate. Therefore, the refrigerant moves from the right part to the left part of the lower tank portion 15c as indicated by arrow b7.

The refrigerant at the left part of the lower tank portion 15c moves up through the multiple tubes 21 at the left part of the first evaporator 15 positioned on the windward side as indicated by arrow b8. Then it flows into the first space 31 in the upper tank portion 15b and the refrigerant flows from there to the refrigerant outlet 25 in the joint 26 as indicated by arrow b9.

Description will be given to the operation of the above configuration. When the compressor 11 is driven by a vehicle engine, the high-temperature, high-pressure refrigerant compressed at and discharged from the compressor 11 flows into the radiator 12. At the radiator 12, the high-temperature refrigerant is cooled by the outside air and condensed. The high-pressure refrigerant flowing out of the radiator 12 flows into the liquid receiver 12a and the refrigerant is separated into gas and liquid in the liquid receiver 12a. Then the liquid refrigerant is guided out of the liquid receiver 12a and passes through the expansion valve 13.

At the expansion valve 13, the valve opening (refrigerant flow amount) is adjusted so that the degree of superheat of the outlet refrigerant (compressor sucked refrigerant) of the evaporator 15 becomes equal to a predetermined value and the high-pressure refrigerant is depressurized. The refrigerant (low-pressure refrigerant) that passed through the expansion valve 13 flows into the one refrigerant inlet 24 provided in the joint 26 of the integrated unit 120.

The flow of refrigerant is separated into gas and liquid and divided into the following flows at the gas-liquid separation portion 16a: the flow of refrigerant in two phases, gas and liquid, going to the first evaporator 15 and the flow of liquid-phase refrigerant going to the second evaporator 18.

The liquid-phase refrigerant going to the second evaporator 18 flows through the refrigerant flow path in the second evaporator 18 as indicated by arrows b1 to b3 in FIG. 21. During this time, in the second evaporator 18, the liquid-phase refrigerant absorbs heat from sent air that passed through the first evaporator 15 in the direction of arrow F1 and is evaporated.

Meanwhile, the refrigerant in two phases, gas and liquid, going to the first evaporator 15 joins with the gas-phase refrigerant that passed through the second evaporator 18. Thereafter, the refrigerant flows through the refrigerant flow path in the first evaporator 15 as indicated by arrows b6 to b8 in FIG. 21. During this time, in the first evaporator 15, the refrigerant in two phases, gas and liquid, absorbs heat from sent air in the direction of arrow F1 and is evaporated. After the evaporation, the gas-phase refrigerant is sucked into the compressor 11 through the one refrigerant outlet 25 and compressed again.

As described above, cooling action can be simultaneously caused at the first and second evaporators 15, 18. For this reason, cool air cooled by both the first and second evaporators 15, 18 can be blown out to the space to be cooled to condition the air in (cool) the space to be cooled.

According to the present embodiment, the refrigerant separated into gas and liquid at the gas-liquid separation portion 16a formed in the joint 26 can be distributed to the first evaporator 15 side and the second evaporator 18 side.

In addition, the joint 26 forming the gas-liquid separation portion 16a is fixed on the side surfaces of the upper tanks 15b, 18b by brazing. Therefore, increase in the physical size of the unit can be suppressed even when the gas-liquid separation portion 16a is integrated as an evaporator unit together with the first and second evaporators.

In the present embodiment, even though the refrigerant flow amount is low, a swirl flow can be stably produced at the gas-liquid separation portion 16a and thus gas-liquid separation can be stably carried out at the gas-liquid separation portion 16a, similarly to that in the first embodiment.

(Fourth Embodiment)

Figure 23:
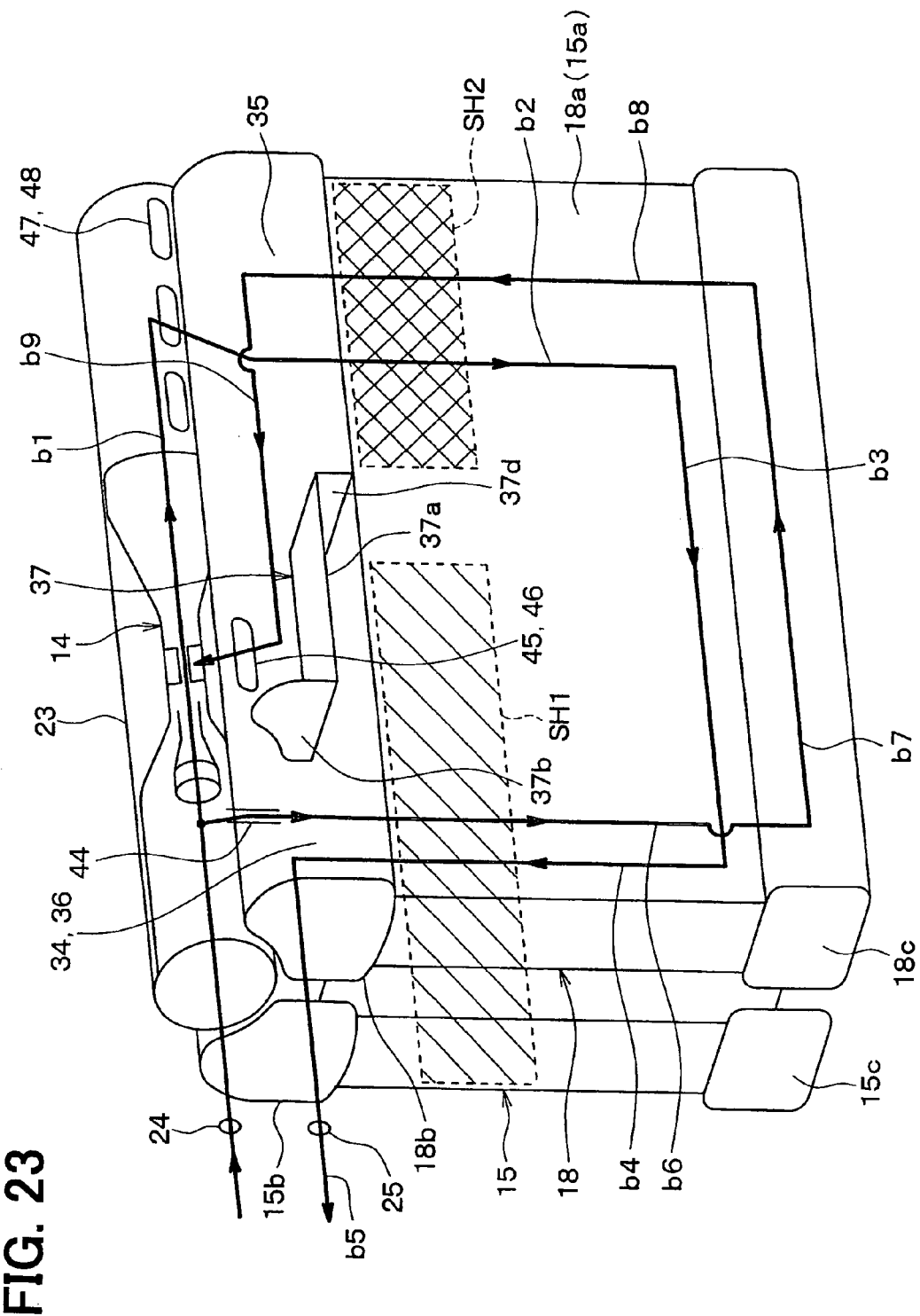
FIG. 23 is a schematic perspective view of an integrated unit in a fourth embodiment.

In the first embodiment, the inner space in the upper tank portion 18b of the second evaporator 18 is partitioned into three spaces, the first to third spaces 34 to 36. At the same time, the inner space in the lower tank portion 18c of the second evaporator 18 is partitioned into the first space 38 and the second space 39. In the fourth embodiment, as illustrated in FIG. 23, the first space 34 or the third space 36 is not divided in the upper tank portion 18b of the second evaporator 18 and one space is defined therein. At the same time, the inner space in the lower tank portion 18c of the second evaporator 18 is not partitioned and one space is defined there.

Specifically, the following plates in the first embodiment are disused: the partitioning plate 37c of the partitioning portion 37 in the upper tank portion 18b and the partitioning plate 40 in the lower tank portion 18c.

Thus the refrigerant flow path in the entire integrated unit 20 is as indicated by arrows b1 to b9 in FIG. 23.

Also in the present embodiment, the superheat area (downstream area in the refrigerant flow) SH1 of the first evaporator 15 and the superheat area SH2 of the second evaporator do not overlap with each other. The entire first evaporator 15 arranged on the windward side is an outflow-side evaporator and the entire second evaporator 18 arranged on the leeward side is a suction-side evaporator. For this reason, the same effect as in the first embodiment can be obtained.

(Fifth Embodiment)

Figure 24:
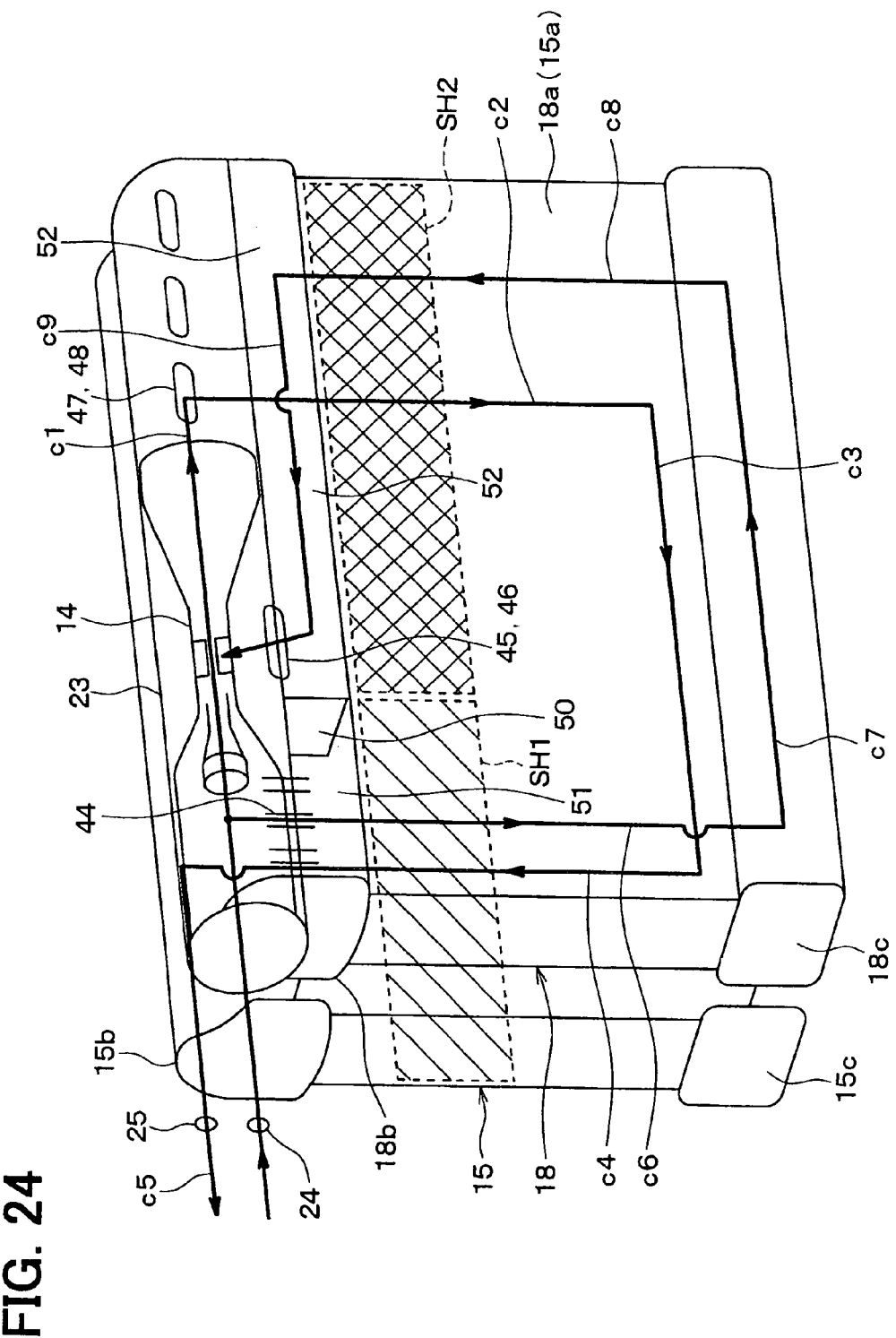
FIG. 24 is a schematic perspective view of an integrated unit in a fifth embodiment.

In the fourth embodiment, the inner space in the upper tank portion 18b of the second evaporator 18 is divided by the partitioning plate 37a of the partitioning portion 37 in a vertical direction. In the present embodiment, as illustrated in FIG. 24, the inner space in the upper tank portion 18b is not divided in the vertical direction. Instead, it is partitioned into a first space 51 located on one side in the longitudinal direction and a second space 52 located on the other side in the longitudinal direction by a partitioning plate 50.

The partitioning plate 33 partitions the inner space in the upper tank portion 15b of the first evaporator 15 into the first and second spaces 31, 32. The position (position in the longitudinal direction of tank) of the partitioning plate 33 and the position (position in the longitudinal direction of tank) of the partitioning plate 50 are aligned with each other.

In the fourth embodiment, the ejector 14 and the housing tank portion 23 are arranged in the valley between the upper tank portions 15b, 18b. In the fifth embodiment, the ejector 14 is disposed directly above the upper tank portion 18b.

Thus the refrigerant flow path of the entire integrated unit 20 is as indicated by arrows c1 to c9 in FIG. 24.

Also in the present embodiment, the superheat area (downstream area in the refrigerant flow) SH1 of the first evaporator 15 and the superheat area SH2 of the second evaporator do not overlap with each other. The entire first evaporator 15 arranged on the windward side is an outflow-side evaporator and the entire second evaporator 18 arranged on the leeward side is a suction-side evaporator. For this reason, the same effect as in the fourth embodiment can be obtained.

(Sixth Embodiment)

Figure 25:
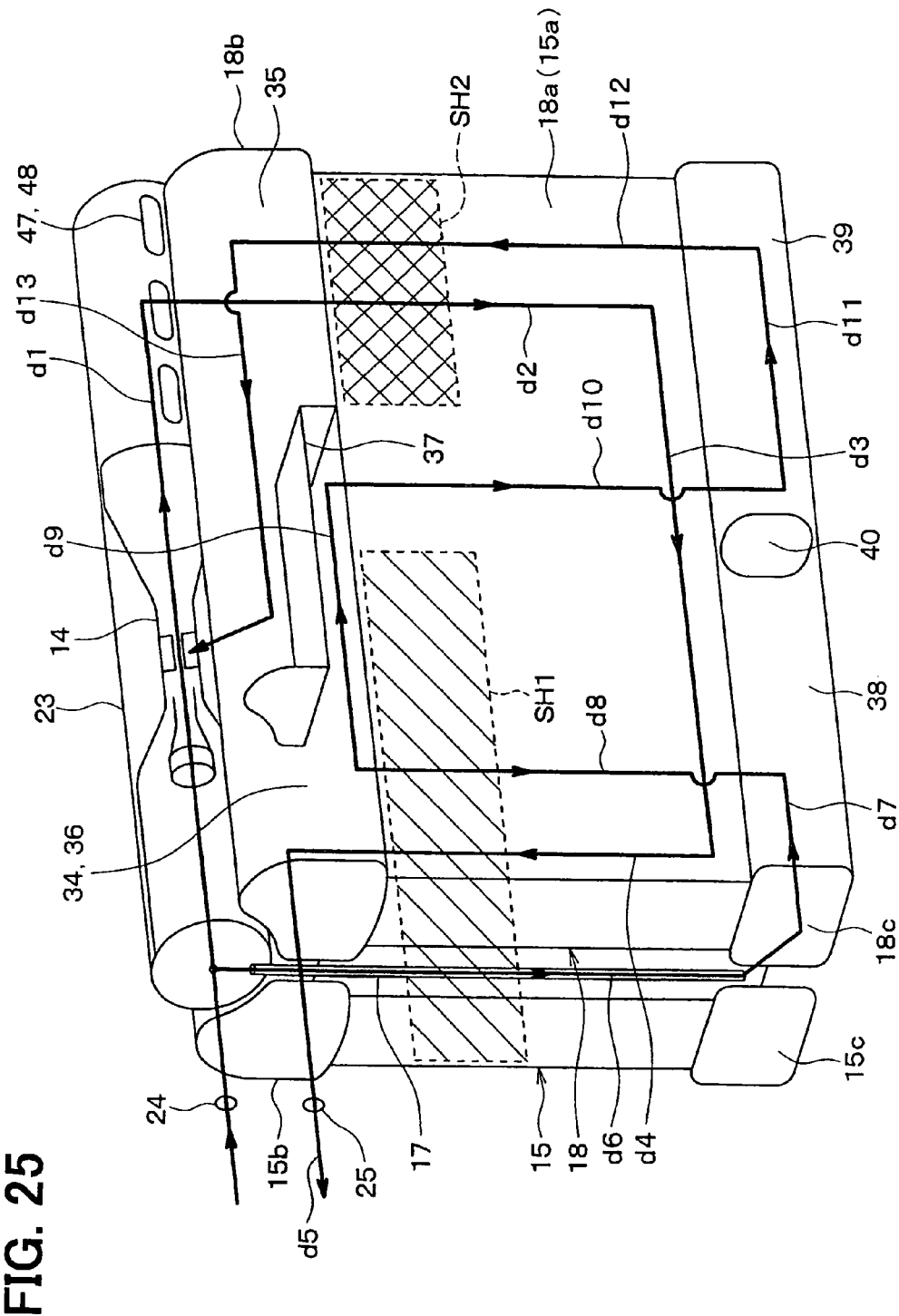
FIG. 25 is a schematic perspective view of an integrated unit in a sixth embodiment.

In the first embodiment, the throttling mechanism 17 is configured of a throttle hole (not shown) formed in the cylindrical surface of the ejector 14. In the sixth embodiment, as illustrated in FIG. 25, the throttling mechanism 17 is configured of a capillary tube placed on the side surface portions of the first and second evaporators 15, 18.

One end of the capillary tube (throttling mechanism) 17 communicates with the refrigerant dividing portion 16b of the flow amount divider 16. The other end of the capillary tube (throttling mechanism) 17 communicates with the refrigerant dividing portion 16b of the flow amount divider 16 and communicates with the first space 34 in the lower tank portion 18c of the second evaporator 18.

In the first embodiment, the inner space in the upper tank portion 18b of the second evaporator 18 is partitioned into three spaces, the first to third spaces 34 to 36. In the sixth embodiment, the first space 34 or the third space 36 is not divided in the inner space in the upper tank portion 18b of the second evaporator 18 and one space is defined there.

Specifically, the partitioning plate 37c of the partitioning portion 37 in the upper tank portion 18b in the first embodiment is disused.

Thus the refrigerant flow path of the entire integrated unit 20 is as indicated by arrows d1 to d13 in FIG. 25.

Also in the present embodiment, the superheat area (downstream area in the refrigerant flow) SH1 of the first evaporator 15 and the superheat area SH2 of the second evaporator do not overlap with each other. The entire first evaporator 15 arranged on the windward side is an outflow-side evaporator and the entire second evaporator 18 arranged on the leeward side is a suction-side evaporator. For this reason, the same effect as in the first embodiment can be obtained.

(Seventh Embodiment)

In the first embodiment, the multiple tubes 21 are linearly formed and the first and second evaporators 15, 18 are so-called multiflow heat exchangers. In the seventh embodiment, as illustrated FIG. 26, the tubes 21 are bent in a meandering pattern and the first and second evaporators 15, 18 are so-called serpentine heat exchangers. In the present embodiment, in other words, the multiple tubes 21 provided in the first embodiment are connected together in a meandering pattern.

The first evaporator 15 is provided with one meandering tube 21 and the lower tank portion 15c is disused. One end of the meandering tube 21 communicates with the first space 31 in the upper tank portion 15*b* and the other end communicates with the second space 32 in the upper tank portion 15*b*.

The inner space in the upper tank portion 18*b* of the second evaporator 18 is partitioned into the following spaces by the partitioning plate 50 as in the third embodiment: the first space 51 located on one side in the longitudinal direction and the second space 52 located on the other side in the longitudinal direction.

The second evaporator 18 is provided with two meandering tubes 21 and the lower tank portion 18*c* is disused. One ends of the two meandering tubes 21 are communicate with the first space 51 in the upper tank portion 18*b* and the other ends communicate with the second space 52 in the upper tank portion 18*b*.

One meandering tube 21 is disposed at the intermediate part of the upper tank portion 18*b* in the longitudinal direction. The other meandering tube 21 meanders so that it bypasses the one meandering tube 21 and is arranged throughout the upper tank portion 18*b* in the longitudinal direction.

The first space 51 in the upper tank portion 18*b* functions as a distribution tank that distributes refrigerant to the two meandering tubes 21. The second space 52 in the upper tank portion 18*b* functions as a collection tank that congregates refrigerant that passed through the two meandering tubes 21.

Figure 26:
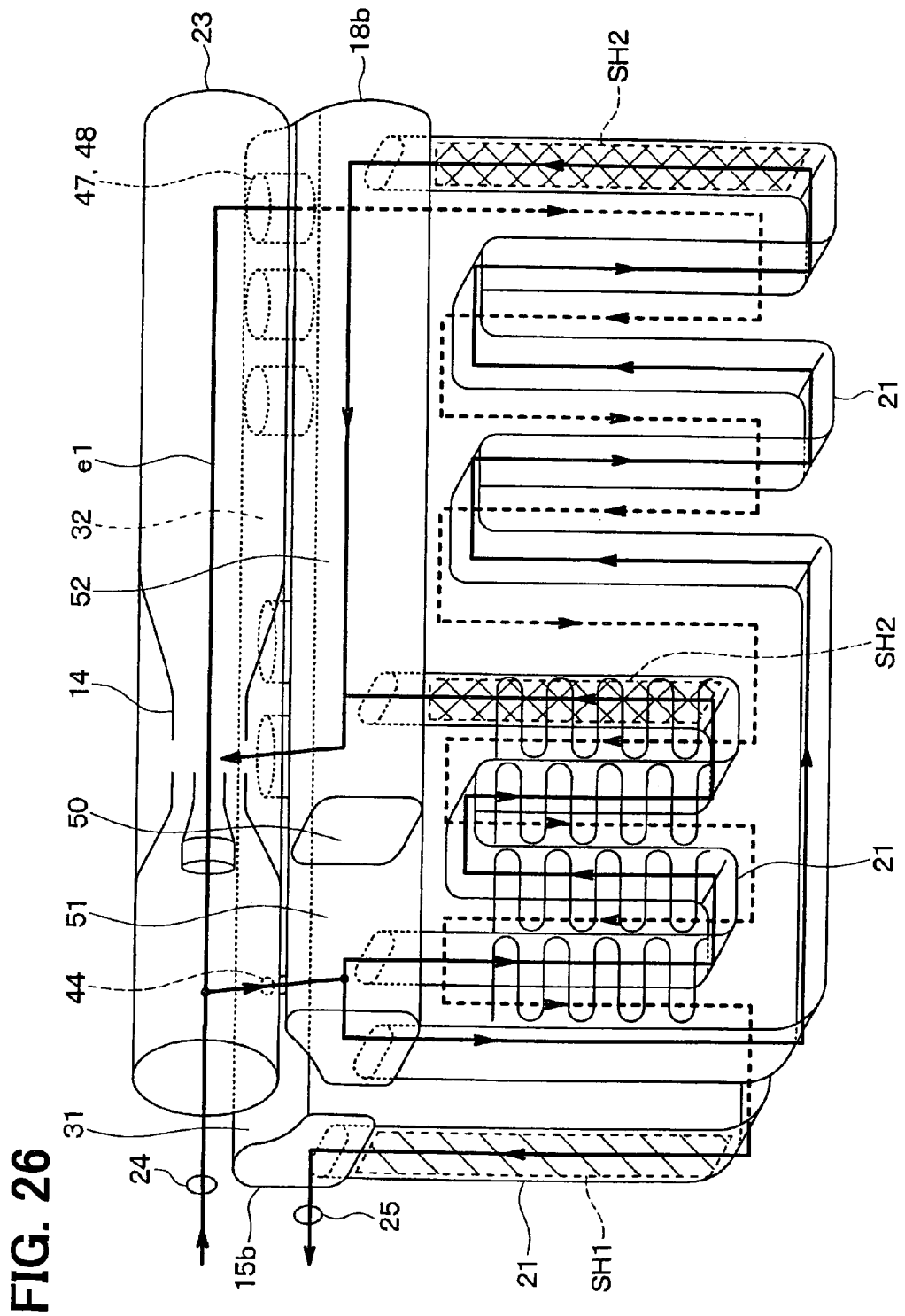
FIG. 26 is a schematic perspective view of an integrated unit in a seventh embodiment.

Thus the refrigerant flow path in the entire integrated unit 20 is as indicated by arrows in FIG. 26. Also in the present embodiment, the superheat area (downstream area in the refrigerant flow) SH1 of the first evaporator 15 and the superheat area SH2 of the second evaporator do not overlap with each other. The entire first evaporator 15 arranged on the windward side is an outflow-side evaporator and the entire second evaporator 18 arranged on the leeward side is a suction-side evaporator. For this reason, the same effect as in the first embodiment can be obtained.

(Other Embodiments)

The invention is not limited to the above embodiments and can be variously modified as described below:

(1) In the above-described embodiments, the evaporator unit 20 is constructed by integrating the ejector 14, first and second evaporators 17, 18, and joint 26. Instead, another ejector refrigeration cycle component may be incorporated into the evaporator unit 20. For example, the temperature expansion valve 13 and the temperature sensing part 13*a* may be integrally assembled to the evaporator unit 20.

(2) In the above-described embodiments, each member is integrally brazed when the member is assembled to the evaporator unit 20. Aside from brazing, various fixing means, such as screwing, swaging, welding, and adhesive bonding, can be used to integrally assemble these members.

(3) In the description of the above embodiments, vapor compression subcritical cycles using refrigerant of chlorofluorocarbon, carbon hydride, or the like whose high pressure does not exceed a critical pressure have been taken as examples. Instead, a refrigerant, such as carbon dioxide, whose high pressure exceeds a critical pressure may be adopted.

In supercritical cycles, compressor discharge refrigerant radiates heat as is in the supercritical state in the radiator 12 and is not condensed. Therefore, the refrigerant cannot be separated into gas and liquid at the liquid receiver 12*a*. Consequently, the following cycle configuration can be adopted: a cycle configuration in which the liquid receiver 12*a* is disused and an accumulator as a low pressure-side gas-liquid separator is disposed downstream of the first evaporator 15 on the suction side of the compressor 11.

Even in such a cycle, the degree of superheat area may be produced in the first evaporator 15 and the second evaporator 18 due to load fluctuation in the cycle. In this case, the same effect as in the above embodiments can be obtained by adopting the evaporator unit of the invention.

(4) In the above-described embodiments, the throttling mechanism 17 is configured of a fixed throttle. Instead, the throttling mechanism 17 may be configured of an electrical control valve whose valve opening (passage throttling opening) can be adjusted with an electric actuator. Or, the throttling mechanism 17 may be configured of a combination of a fixed throttle and an electromagnetic valve.

(5) In the above-described embodiments, a fixed ejector having a nozzle portion 14*a* whose passage area is fixed has been taken an example of the ejector 14. Instead, a variable ejector having a variable nozzle portion whose passage area is adjustable may be used as the ejector 14. As a concrete example of a variable nozzle portion, the following mechanism can be adopted: a mechanism in which a needle is inserted into the passage in the variable nozzle portion and the position of the needle is controlled with an electrical actuator to adjust the passage area.

(6) In the above-described embodiments, the evaporator unit 20 is configured as an indoor heat exchanger and the radiator 12 is configured as an outdoor heat exchanger that radiates heat to the atmosphere. Conversely, the invention may be applied to the following heat pump cycle: a heat pump cycle in which the evaporator unit 20 is configured as an outdoor heat exchanger that absorbs heat from a heat source, such as the atmosphere, and the radiator 12 is configured as an indoor heat exchanger that heats a fluid to be heated, such as air or water.

(7) In the description of each of the above embodiments, a refrigeration cycle for vehicles has been taken as an example. However, the application of the invention is not limited to refrigeration cycles for vehicles and it is similarly applicable also to fixed refrigeration cycles and the like, needless to add.

(8) In the first embodiment, the multiple tubes 21 are linearly formed and the first and second evaporators 15, 18 are so-called multiflow heat exchangers. Instead, the tubes 21 may be bent in a meandering pattern and the first and second evaporators 15, 18 may be so-called serpentine heat exchangers.

What is claimed is:

1. An evaporator unit comprising:
an ejector configured to suck refrigerant through a refrigerant suction port by a high-speed refrigerant flow jetted from a nozzle portion, to mix the refrigerant jetted from the nozzle portion and the refrigerant sucked through the refrigerant suction port, and to discharge the refrigerant;
a first evaporator connected to the outlet side of the ejector and evaporating the refrigerant discharged from the ejector;
a second evaporator connected to the refrigerant suction port and evaporating the refrigerant to be drawn into the ejector;
a refrigerant dividing portion connected to the inlet side of the nozzle portion and the inlet side of the second evaporator and adjusting the flow amount of refrigerant flowing in and divided to the nozzle portion and the second evaporator; and
a joint in which a refrigerant inlet and a refrigerant outlet are formed and which causes the refrigerant flowing in through the refrigerant inlet to flow out to the refrigerant dividing portion and causes the refrigerant flowing out of the first evaporator to flow out to the refrigerant outlet, wherein the ejector, the first evaporator, the second evaporator, the refrigerant dividing portion, and the joint are integrally assembled to configure an integrated unit, the joint is provided with a gas-liquid separation portion that causes the refrigerant flowing therein to swirl and to separate the refrigerant into gas and liquid, and the ejector, the refrigerant dividing portion and the joint are arranged in a longitudinal direction of the ejector.

2. The evaporator unit according to claim 1, wherein the gas-liquid separation portion includes a columnar space through which refrigerant swirls and flows in the axial direction and an introduction passage for guiding refrigerant to the columnar space, the introduction passage is eccentrically connected to the columnar space as viewed form the axial direction, and the gas-liquid separation portion is configured of a laminated structure obtained by laminating a plurality of plate members in the axial direction.

3. The evaporator unit according to claim 2, wherein the plate members include a flow-path formation plate member in which a circular hole forming the columnar space and a long and thin hole forming the introduction passage are formed, the flow-path formation plate member has an acute-angled corner located between the circular hole and the long and thin hole, and in the flow-path formation plate member, the circular hole and the long and thin hole are formed during press molding.

4. The evaporator unit according to claim 3, wherein the plate members defining the gas-liquid separation portion further includes an end plate member adjoining to the flow-path formation plate member and having a flat surface closing at least a part of the circular hole.

5. The evaporator unit according to claim 1, wherein the introduction passage is connected to the outer circumferential portion of the columnar space in the tangential direction as viewed from the axial direction.

6. The evaporator unit according to claim 1, further comprising a throttling mechanism located between the refrigerant dividing portion and the second evaporator and depressurizing the refrigerant flowing into the second evaporator, wherein the throttling mechanism is integrally assembled to the integrated unit.

7. An evaporator unit comprising:

a gas-liquid separation portion separating refrigerant into gas and liquid; and evaporators connected to an outlet side of the gas-liquid separation portion and evaporating the refrigerant flowing out of the gas-liquid separation portion, wherein the gas-liquid separation portion includes a columnar space through which refrigerant swirls and flows in the axial direction, and an introduction passage guiding refrigerant into the columnar space, the introduction passage is eccentrically connected to the columnar space as viewed from the axial direction, and the gas-liquid separation portion is configured of a laminated structure obtained by laminating a plurality of plate members in the axial direction.

8. The evaporator unit according to claim 7, wherein the plate members configuring the gas-liquid separation portion include a flow-path formation plate member in which a circular hole forming the columnar space and a long and thin hole forming the introduction passage are formed, the flow-path formation plate member has an acute-angled corner located between the circular hole and the long and thin hole, and in the flow-path formation plate member, the circular hole and the long and thin hole are formed during press molding.

9. The evaporator unit according to claim 8, wherein the plate members configuring the gas-liquid separation portion further include an end plate member adjoining to the flow-path formation plate member and having a flat surface closing at least part of the circular hole.

10. An evaporator unit comprising:

an ejector sucking refrigerant through a refrigerant suction port by a high-speed refrigerant flow jetted from a nozzle portion for depressurizing refrigerant, and mixing the sucked refrigerant sucked through the refrigerant suction port and the jetted refrigerant thereby pressurizing the refrigerant;

a first evaporator evaporating the refrigerant flowing out of the ejector; and a second evaporator evaporating refrigerant and causing the refrigerant to flow out to the refrigerant suction port, wherein the first evaporator includes a plurality of outflow-side tubes through which refrigerant exchanging heat with air passes and an outflow-side tank portion adapted to distribute or collect refrigerant for the outflow-side tubes, the second evaporator includes a plurality of suction-side tubes through which refrigerant exchanging heat with air passes and a suction-side tank portion which adapted to distribute or collect refrigerant for the suction-side tubes, the first evaporator and the second evaporator are arranged in series with each other with respect to the flow of air to be sent to a space to be cooled, the ejector, the outflow-side tank portion, and the suction-side tank portion are arranged to be parallel with one another in its longitudinal directions, the ejector, the first evaporator and the second evaporator are integrally assembled to form an integrated unit, a refrigerant inlet is provided at a part of the integrated unit located on one side in the longitudinal direction, such that a part of the refrigerant flowing through the refrigerant inlet flows into the nozzle portion, and the refrigerant flowing out of the ejector flows into an outflow-side passage formed in the outflow-side tank portion, the refrigerant flowing out of the outflow-side passage flows, from the outflow-side tubes on the other side connected to the part of the outflow-side tank portion located on the other side in the longitudinal direction among the plurality of outflow-side tubes, to the outflow-side tubes on one-end side connected to the part of the outflow-side tank portion located on one side in the longitudinal direction among the plurality of outflow-side tubes, the remaining refrigerant of the refrigerant flowing into the refrigerant inlet flows into the suction-side tubes on one-end side connected to the part of suction-side tank portion located on one side in the longitudinal direction among the plurality of suction-side tubes and flows out of the suction-side tubes on the other-end side connected to the part of the suction-side tank portion located on the other side in the longitudinal direction among the plurality of suction-side tubes, the refrigerant flowing out of the suction-side tubes on the other end-side, flows into a suction-side passage formed in the suction-side tank portion, and the refrigerant in the suction-side passage is sucked into the refrigerant suction port.

11. The evaporator unit according to claim 10, wherein the second evaporator includes a partitioning portion which partitions at least part of the inner space in the suction-side tank portion into a tube-side space located on the side closer to the suction-side tubes and an anti-tube-side space located on the side farther away from the suction-side tubes, and the suction-side passage is configured of the anti-tube-side space.

12. The evaporator unit according to claim 11, wherein the following relation is satisfied:

$$Ai2 \leq Ai1 \leq Ao$$

where, Ao is a sectional area of a space formed in the outflow-side tank portion into which the refrigerant flowing out of the ejector flows, in a section perpendicular to the longitudinal direction; Ai1 is a sectional area of the suction-side passage in a section perpendicular to the longitudinal direction; and Ai2 is a sectional area of the tube-side space in a section perpendicular to the longitudinal direction.

13. The evaporator unit according to claim 10, wherein a tube number of the suction-side tubes on the other-end side is equal to or larger than a tube number of the suction-side tubes on the one-end side.

14. The evaporator unit according to claim 10, wherein the tube number of the outflow-side tubes on one-end side is equal to or larger than the tube number of the outflow-side tubes on the other-end side.

15. The evaporator unit according to claim 10, further comprising a joint in which the refrigerant inlet is formed, the joint defining therein an inflow passage for causing the refrigerant flowing into the refrigerant inlet to flow toward nozzle portion and the suction-side tube on the one-end side, wherein the joint is disposed on the one end side of the ejector.

16. The evaporator unit according to claim 15, wherein the inflow passage in the joint is provided with a swirl flow generation mechanism adapted to cause a refrigerant flow in the inflow passage to swirl.

17. The evaporator unit according to claim 15, wherein in the joint, an outflow passage is provided for causing refrigerant to flow out of the first evaporator.

18. The evaporator unit according to claim 10, further comprising:

a housing tank portion different from the outflow-side tank portion and the suction-side tank portion, and housing the ejector, wherein the outflow-side tank portion is provided with an outflow-side through hole penetrating the outflow-side tank portion from the inner circumferential surface thereof to the outer circumferential surface thereof, the housing tank portion is provided with an outflow-side communication hole penetrating the housing tank portion from the inner circumferential surface thereof to the outer circumferential surface thereof and communicating with the outflow-side through hole, the inner space in the housing tank portion communicates with the inner space in the outflow-side tank portion through the outflow-side through hole and the outflow-side communication hole, a rib protruded in the direction of assembly of the housing tank portion to the outflow-side tank portion is formed at an opening edge portion of the outflow-side communication hole, and wherein the rib is inserted into the outflow-side through hole.

19. The evaporator unit according to claim 10, wherein the first evaporator and the second evaporator have a plurality of tube plates in which the outflow-side tubes and the suction-side tubes are formed by joining a pair of plates together and are each configured of a laminated heat exchanger formed by laminating the plurality of tube plates.

20. The evaporator unit according to claim 10, wherein each of the first evaporator and the second evaporator is configured of a serpentine heat exchanger in which the outflow-side tubes and the suction-side tubes are bent in a meandering pattern.

* * * * *